United States Patent
Asakimori

(10) Patent No.: US 10,270,941 B2
(45) Date of Patent: Apr. 23, 2019

(54) INFORMATION PROCESSING SYSTEM, AUTHENTICATION METHOD, AND NON-TRANSITORY STORAGE MEDIUM STORING AUTHENTICATION PROGRAM FOR INPUTTING AUTHENTICATION PATTERN

(71) Applicant: Hiroki Asakimori, Tokyo (JP)

(72) Inventor: Hiroki Asakimori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/531,797

(22) PCT Filed: Feb. 19, 2016

(86) PCT No.: PCT/JP2016/000897
§ 371 (c)(1),
(2) Date: May 31, 2017

(87) PCT Pub. No.: WO2016/147560
PCT Pub. Date: Sep. 22, 2016

(65) Prior Publication Data
US 2017/0318189 A1    Nov. 2, 2017

(30) Foreign Application Priority Data
Mar. 13, 2015  (JP) ................... 2015-051235

(51) Int. Cl.
*G06F 21/36* (2013.01)
*H04N 1/44* (2006.01)
(Continued)

(52) U.S. Cl.
CPC ............ *H04N 1/4413* (2013.01); *B41J 29/00* (2013.01); *B41J 29/38* (2013.01); *B41J 29/42* (2013.01);
(Continued)

(58) Field of Classification Search
CPC ............ H04N 1/4413; H04N 1/00392; H04N 1/4433; G06F 21/36
(Continued)

(56) References Cited

U.S. PATENT DOCUMENTS

| 8,904,479 B1* | 12/2014 | Johansson | G06F 21/36 |
| | | | 382/181 |
| 2006/0053301 A1* | 3/2006 | Shin | G06F 21/36 |
| | | | 713/183 |

(Continued)

FOREIGN PATENT DOCUMENTS

| JP | 2011-060110 | 3/2011 |
| JP | 2014-075011 | 4/2014 |

(Continued)

OTHER PUBLICATIONS

International Search Report dated May 24, 2016 in PCT/JP2016/000897 filed on Feb. 19, 2016.

*Primary Examiner* — Jamares Q Washington
(74) *Attorney, Agent, or Firm* — IPUSA, PLLC

(57) ABSTRACT

To maintain confidentiality by a simile authentication procedure. An image processing device includes an input receiver configured to receive an input of an authentication pattern that is a trajectory of contact coordinates indicating a contact position on an operation unit; and a concatenation image display unit configured to display an image connecting, out of a plurality of predetermined images that are displayed on the operation unit, a part of the predetermined images that includes a first predetermined image and a second predetermined image of the predetermined images that are connected by the trajectory, wherein, prior to a display area of the first predetermined image overlapping the contact coordinates, a display area of the second predetermined image overlaps the contact coordinates.

16 Claims, 20 Drawing Sheets

(51) Int. Cl.
*B41J 29/00* (2006.01)
*B41J 29/38* (2006.01)
*B41J 29/42* (2006.01)
*G03G 21/00* (2006.01)
*G03G 15/00* (2006.01)
*H04N 1/00* (2006.01)

(52) U.S. Cl.
CPC ......... *G03G 15/5091* (2013.01); *G03G 21/00* (2013.01); *G06F 21/36* (2013.01); *H04N 1/00392* (2013.01); *H04N 1/4433* (2013.01); *H04N 2201/0094* (2013.01)

(58) Field of Classification Search
USPC ............... 358/1.14; 399/80, 81; 715/863
See application file for complete search history.

(56) References Cited

U.S. PATENT DOCUMENTS

| | | | | |
|---|---|---|---|---|
| 2008/0092245 A1* | 4/2008 | Alward | ................ | G06F 21/316 726/28 |
| 2010/0031346 A1* | 2/2010 | Kano | .................... | G06F 21/316 726/19 |
| 2013/0340072 A1* | 12/2013 | Chu | ........................ | G06F 21/36 726/18 |
| 2014/0137049 A1 | 5/2014 | Jung et al. | | |

FOREIGN PATENT DOCUMENTS

| | | |
|---|---|---|
| JP | 5634566 | 12/2014 |
| JP | 2015-032118 | 2/2015 |

* cited by examiner

[Fig. 1]
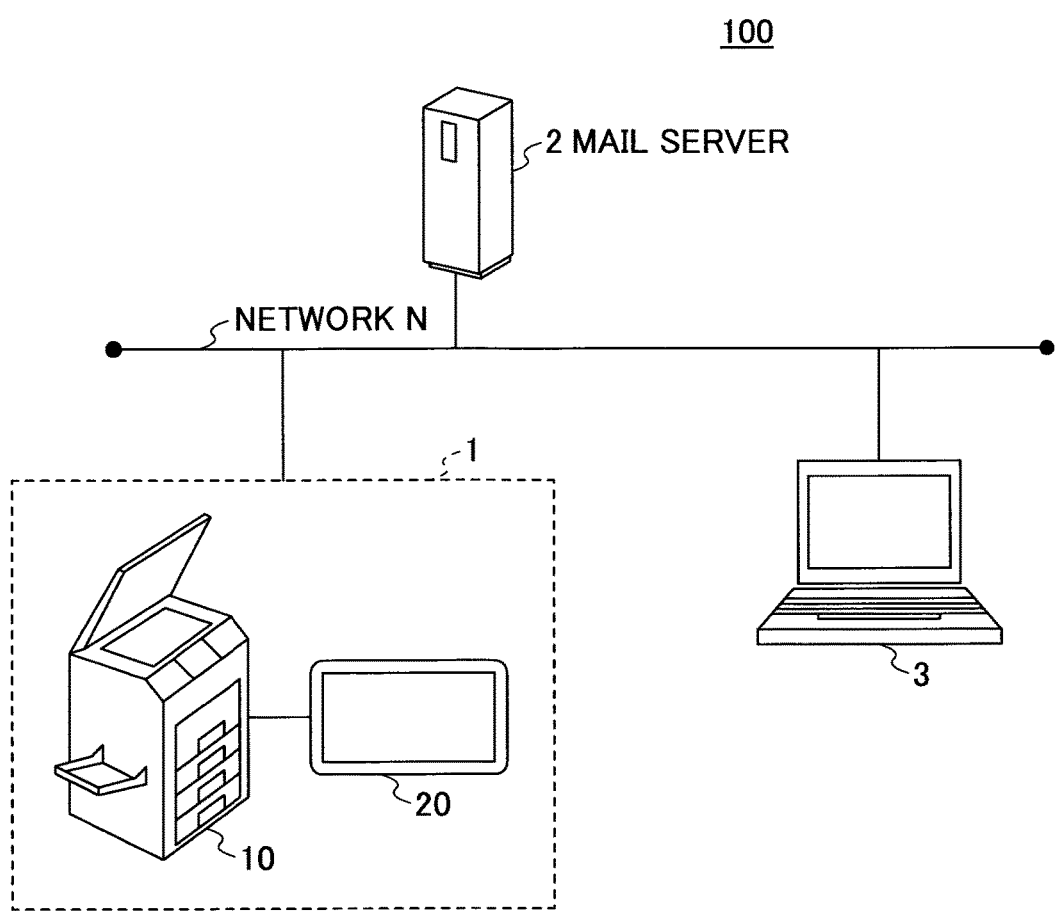

[Fig. 2]
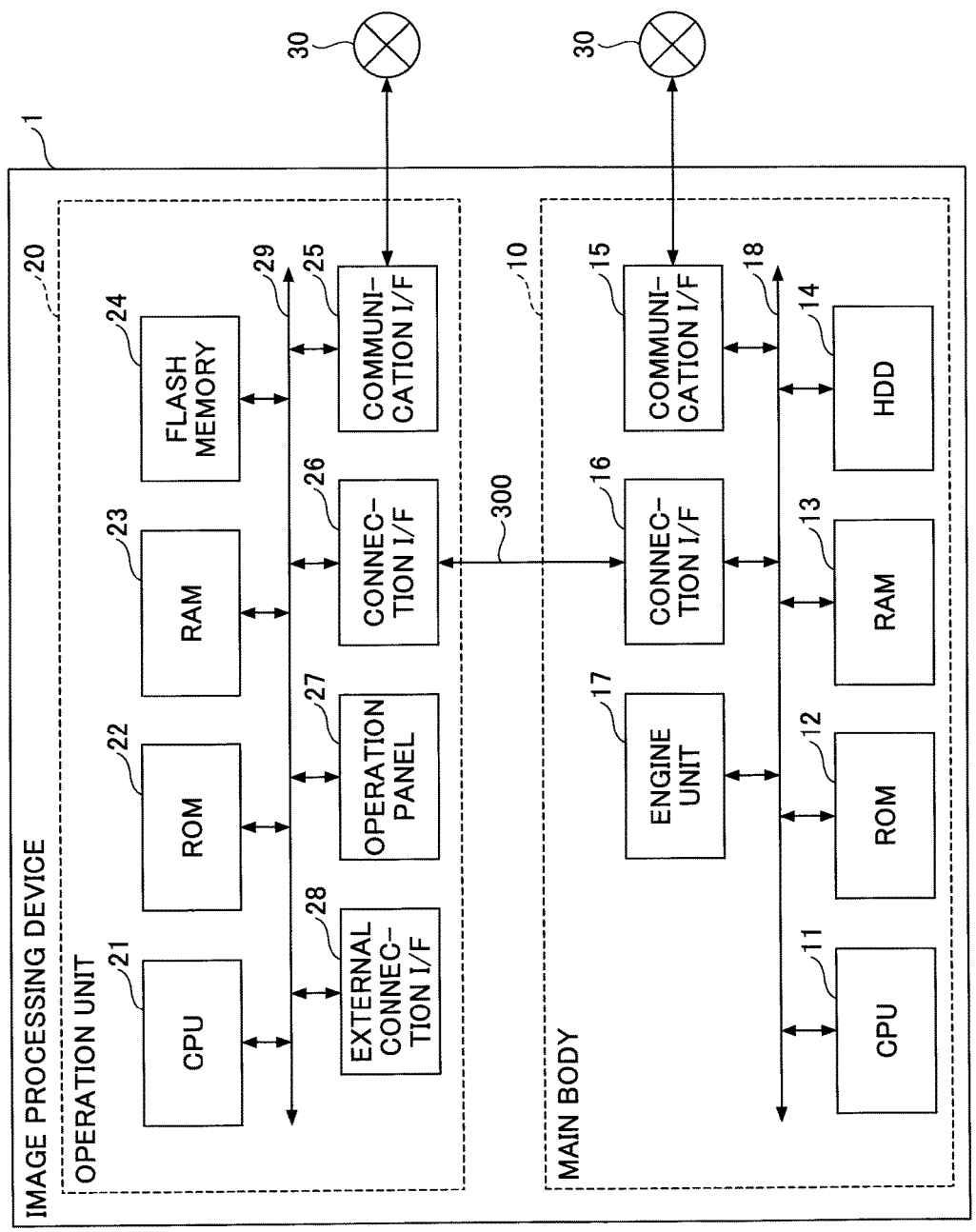

[Fig. 3]
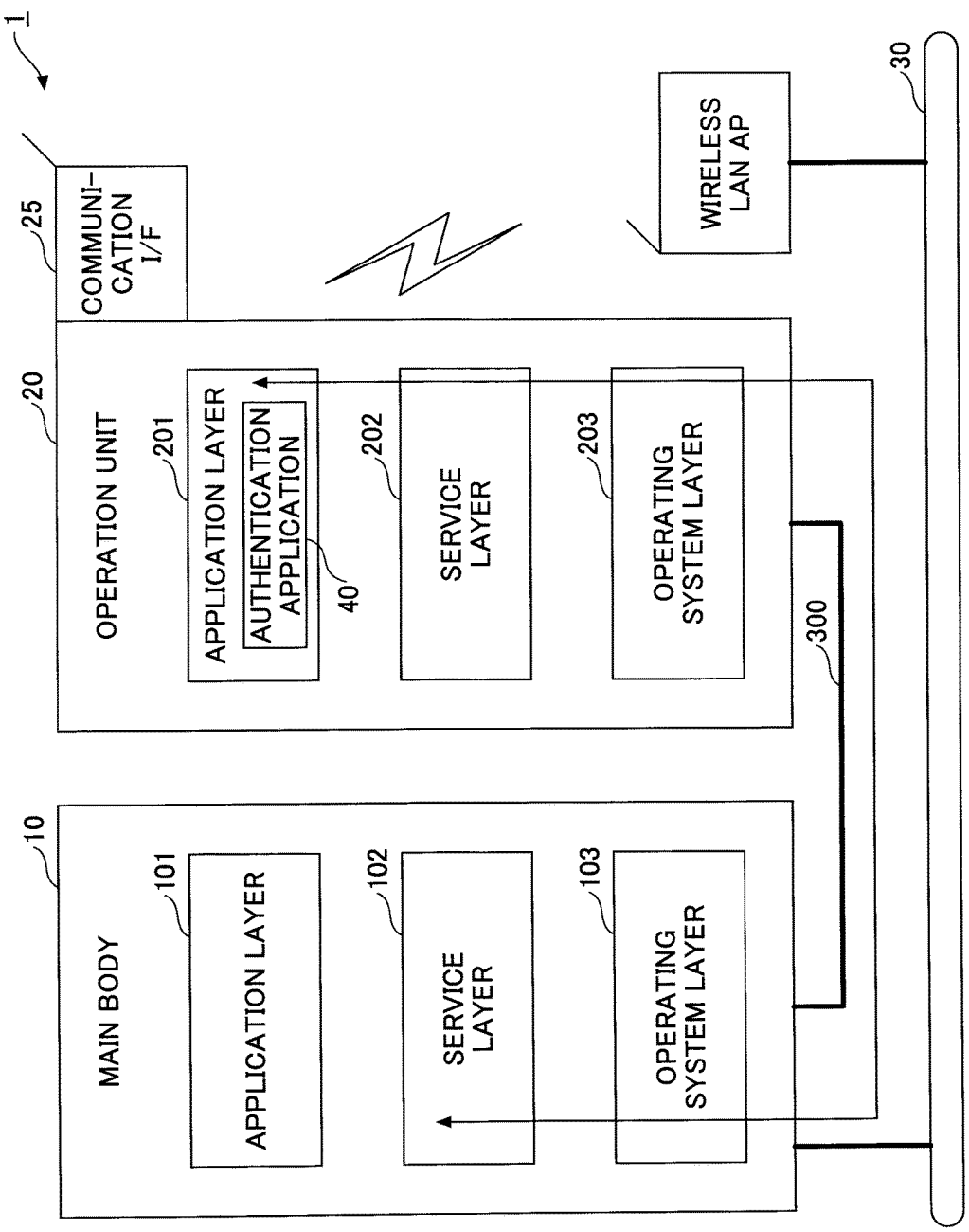

[Fig. 4]
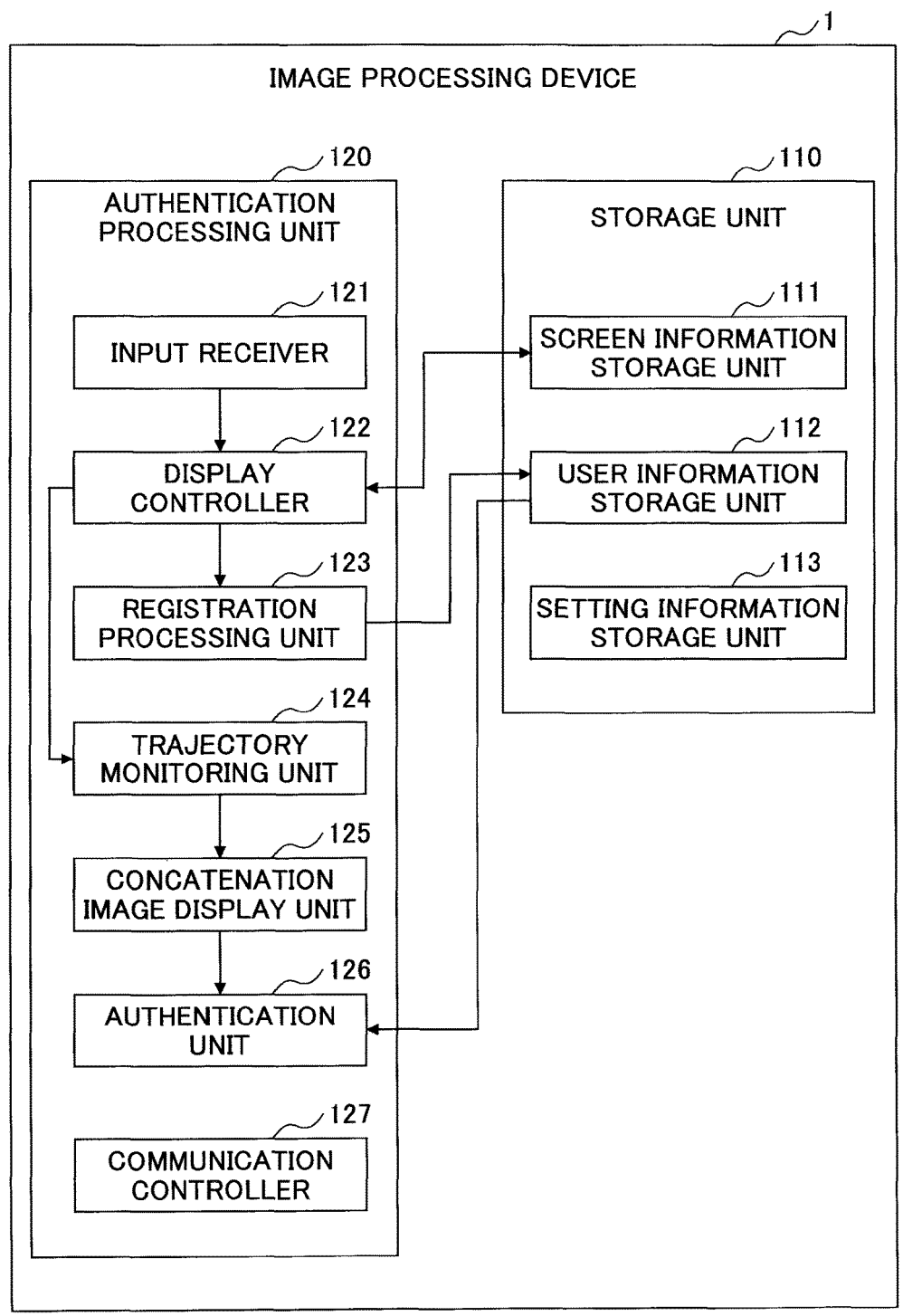

[Fig. 5]
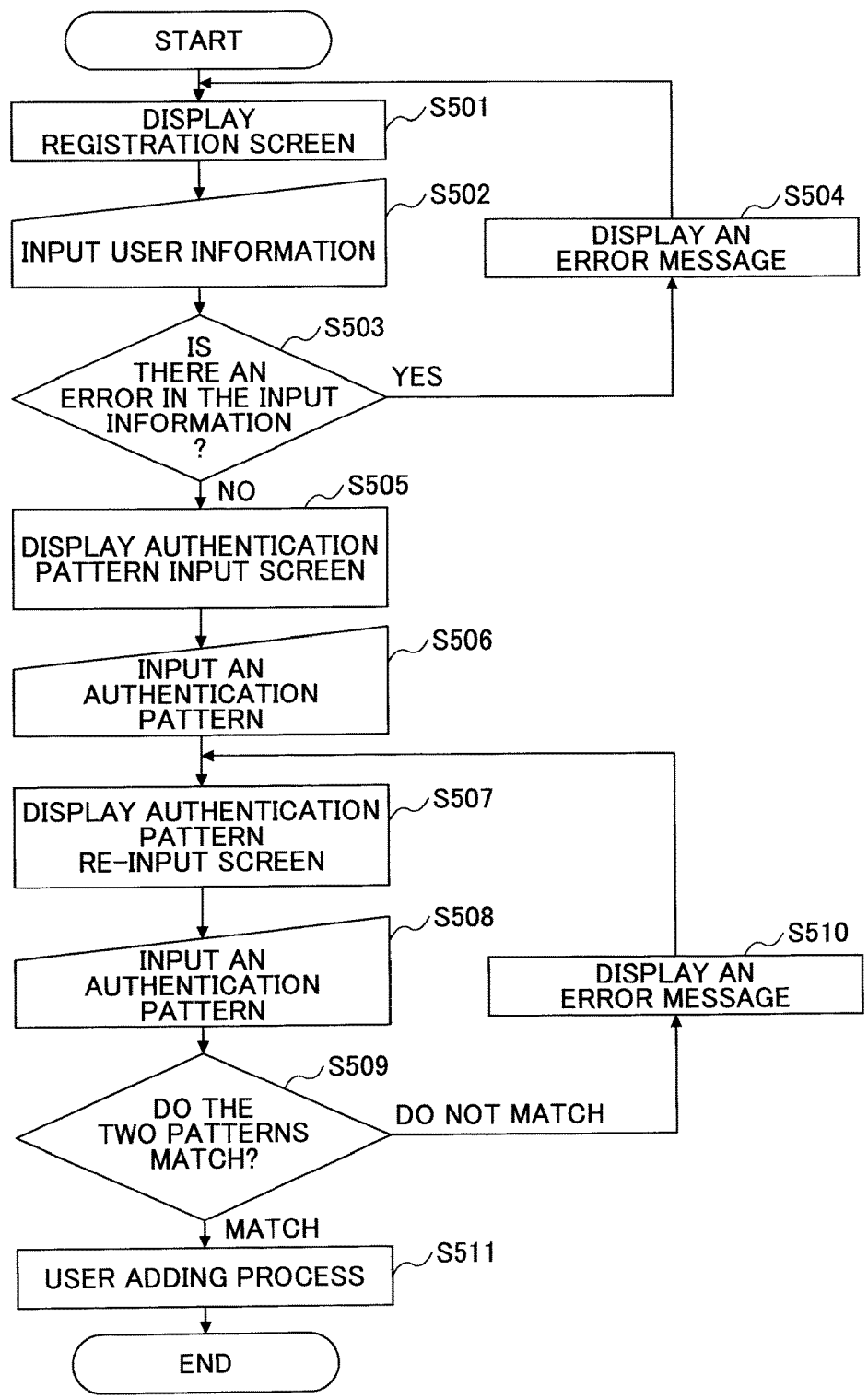

[Fig. 6A]
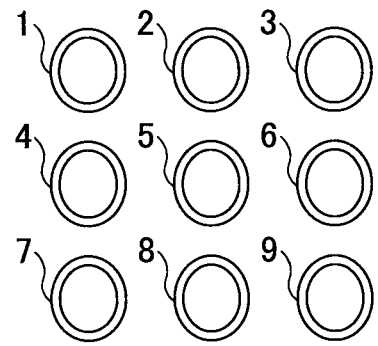
[Fig. 6B]
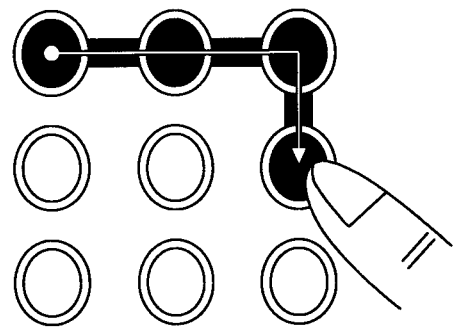
[Fig. 6C]
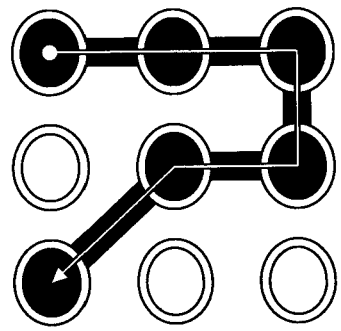

[Fig. 7A]
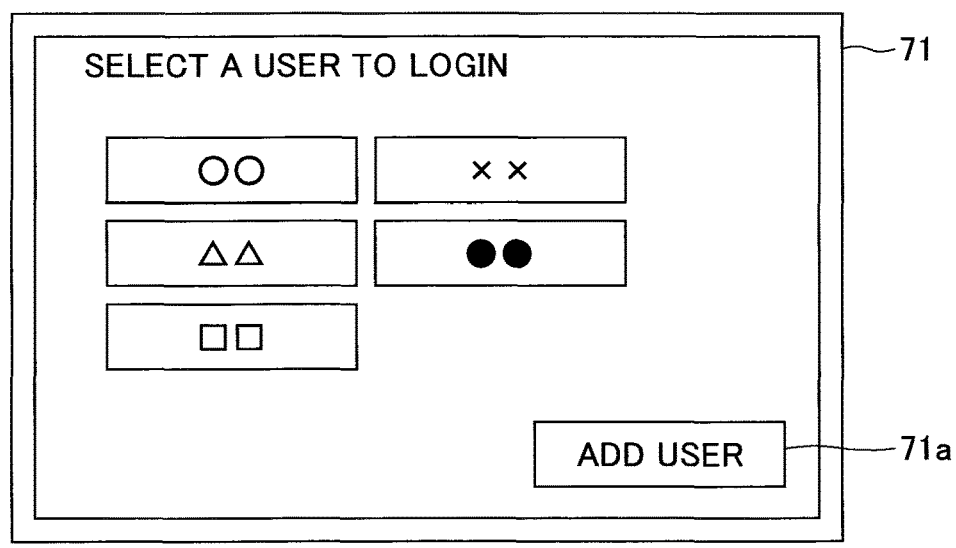
[Fig. 7B]
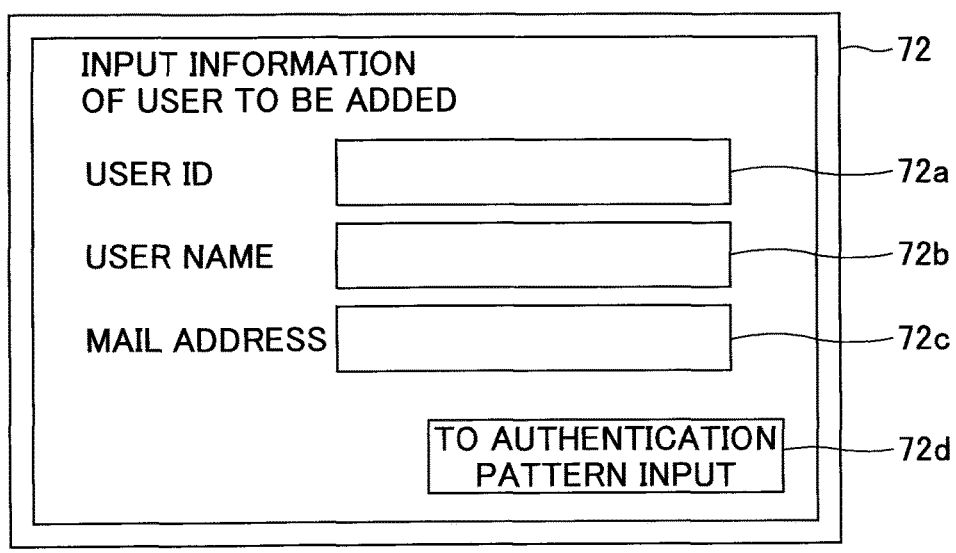

[Fig. 7C]
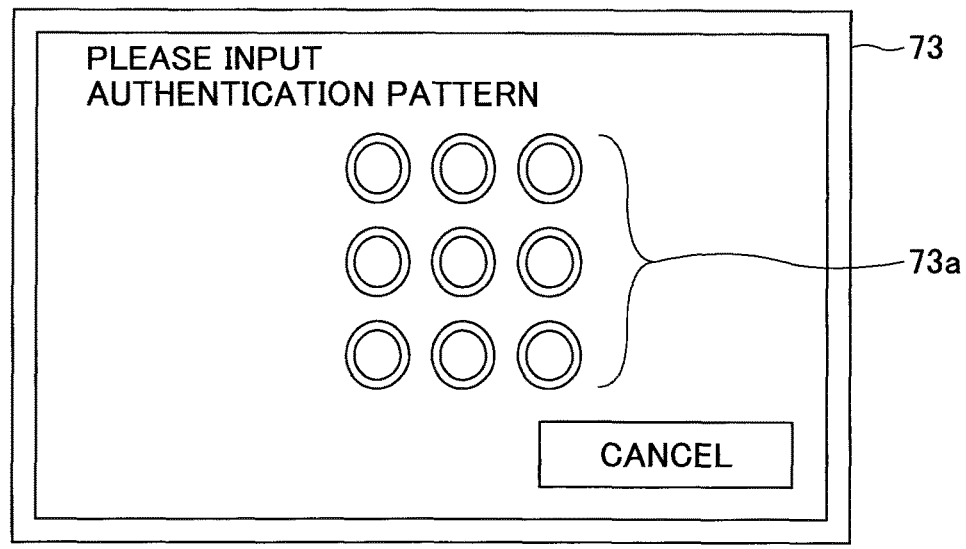
[Fig. 7D]
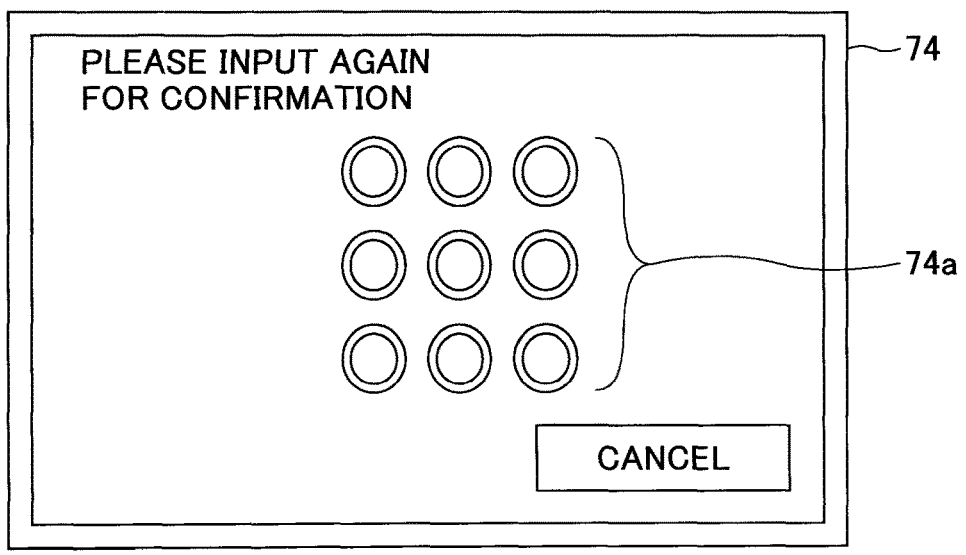

[Fig. 8]

| | 112A |
|---|---|
| USER ID | 001 |
| USER NAME | ○○×× |
| MAIL ADDRESS | ○×@example.co.jp |
| AUTHENTICATION PATTERN | 123657 |
| STATUS | AVAILABLE |

[Fig. 9A]
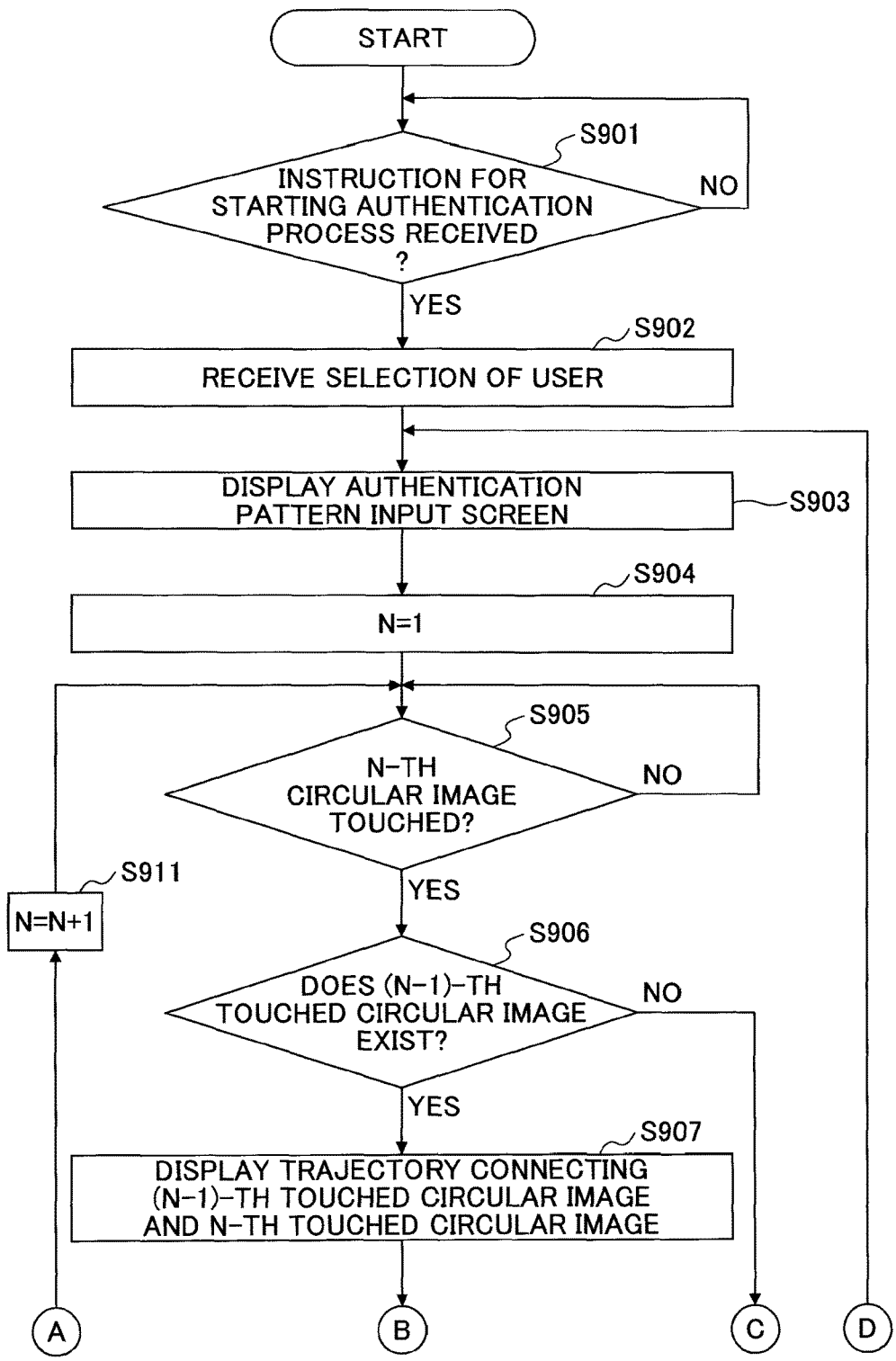

[Fig. 9B]
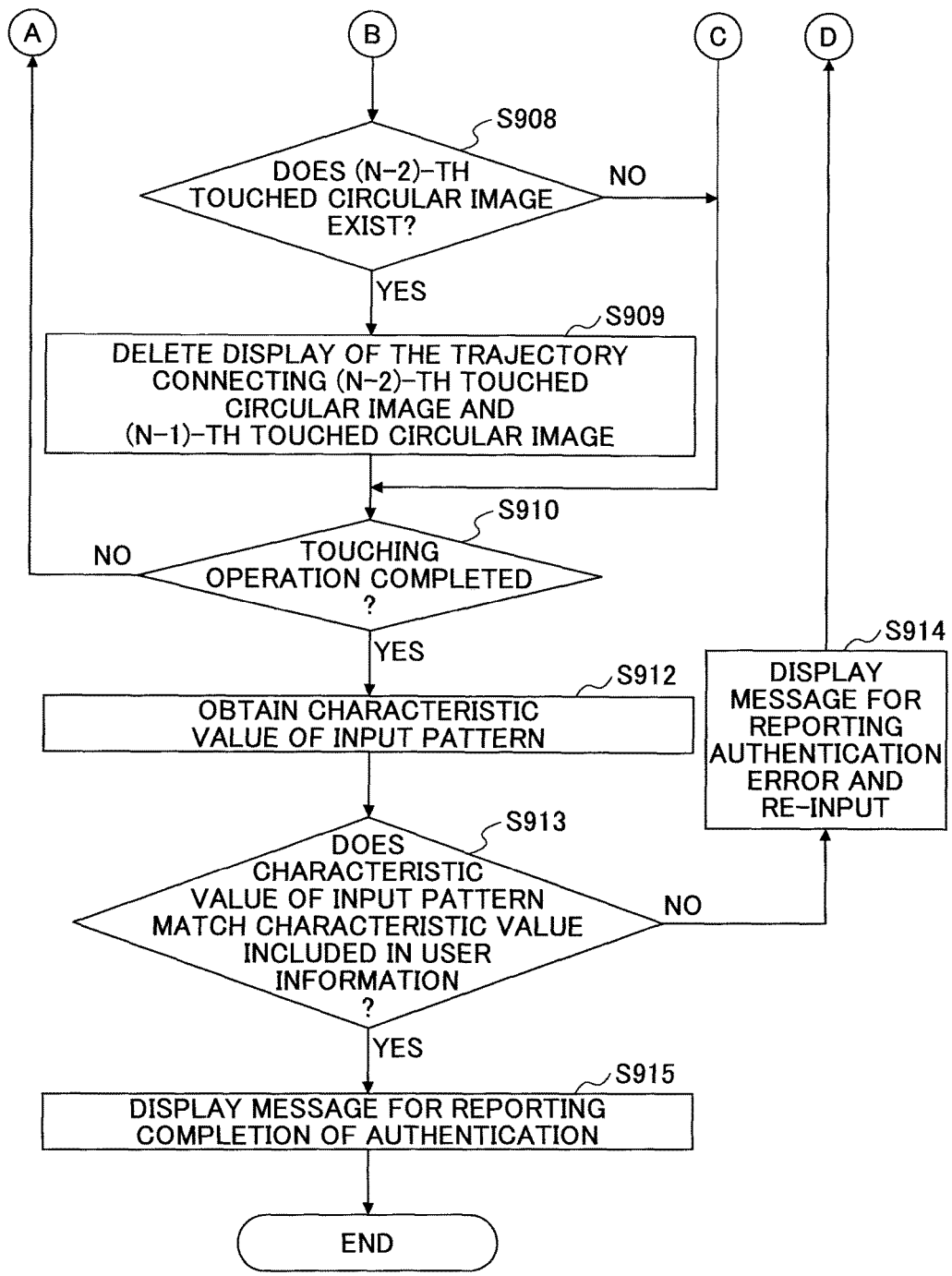

[Fig. 10A]
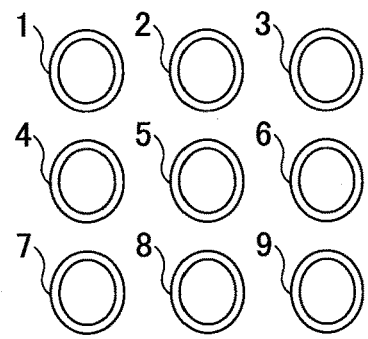
[Fig. 10B]
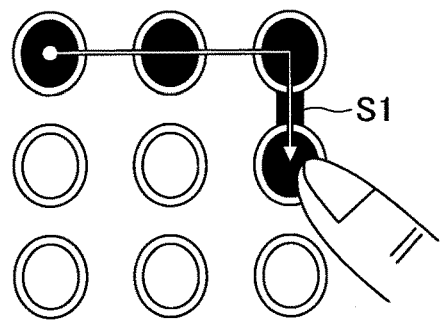
[Fig. 10C]
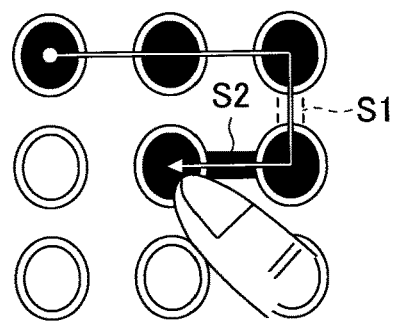

[Fig. 11A]
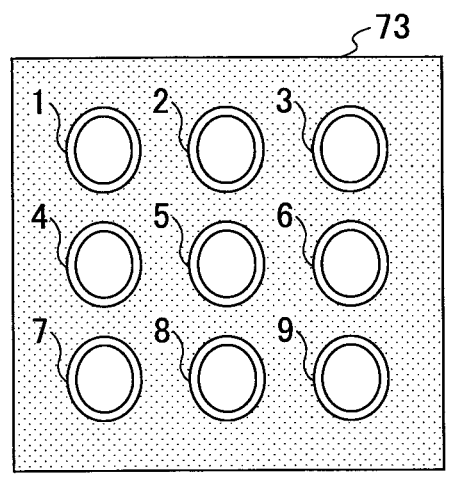
[Fig. 11B]
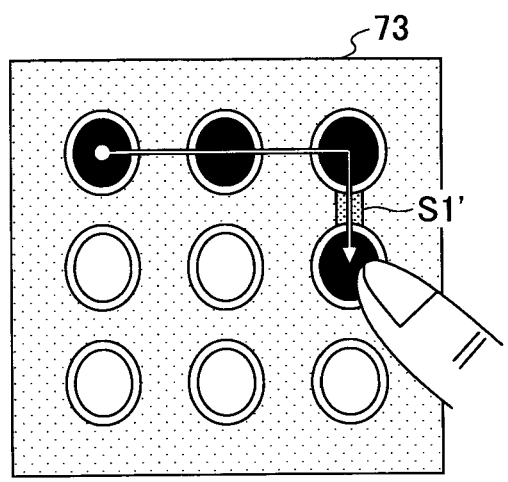

[Fig. 11C]
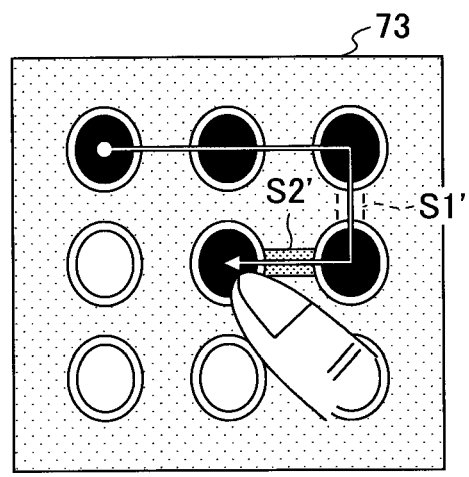
[Fig. 12A]
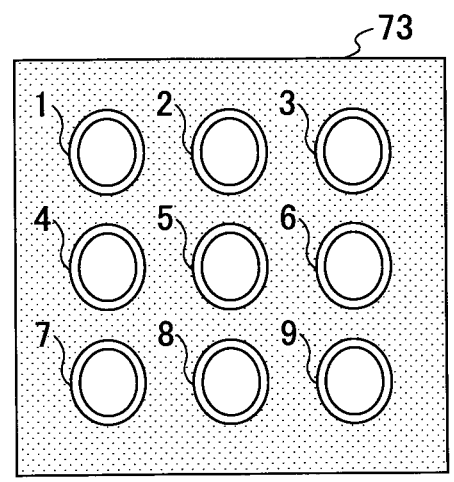

[Fig. 12B]
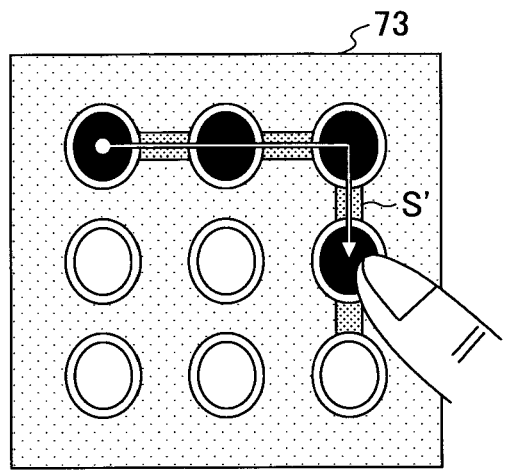
[Fig. 12C]
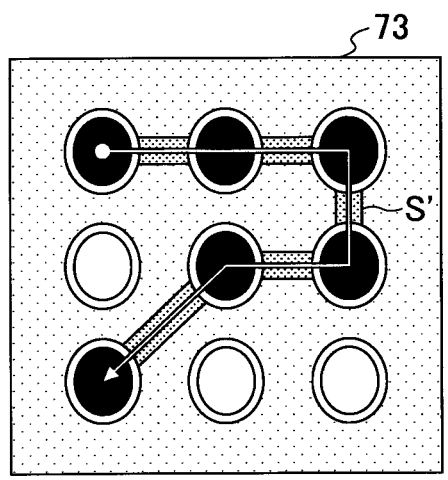

[Fig. 13A]
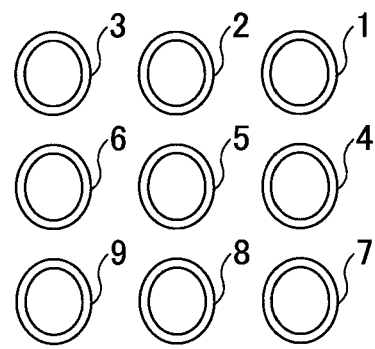
[Fig. 13B]
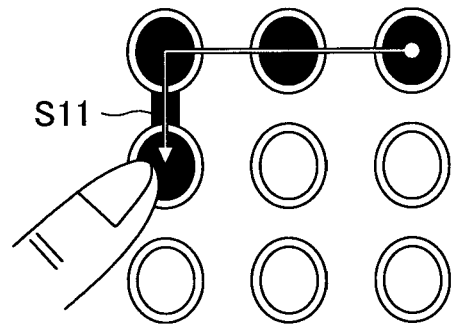
[Fig. 13C]
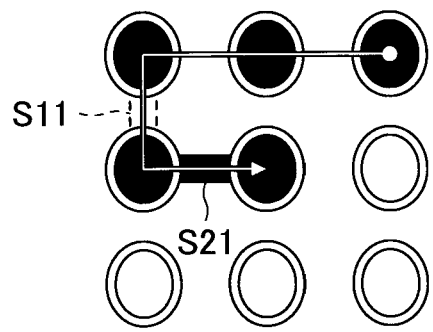

[Fig. 14]
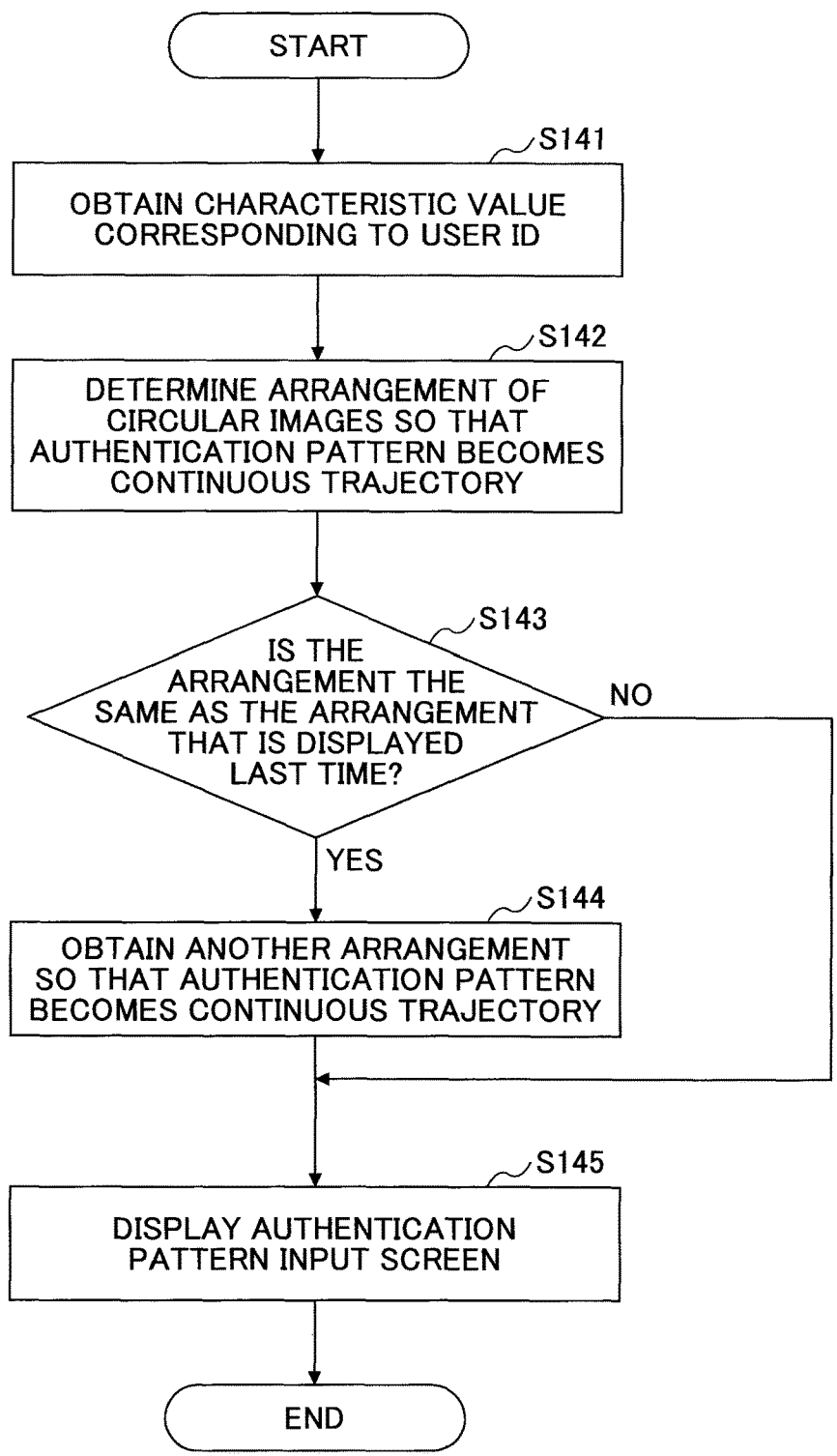

[Fig. 15A]
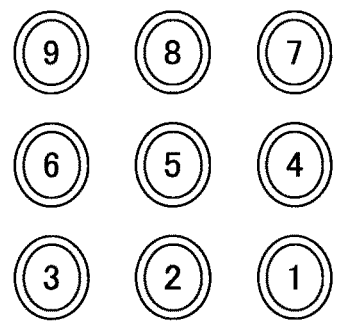
[Fig. 15B]
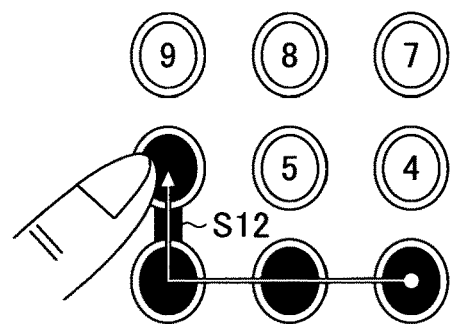
[Fig. 15C]
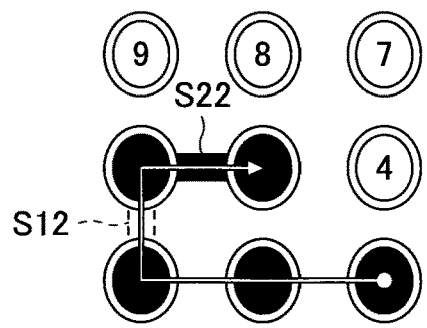

[Fig. 16]
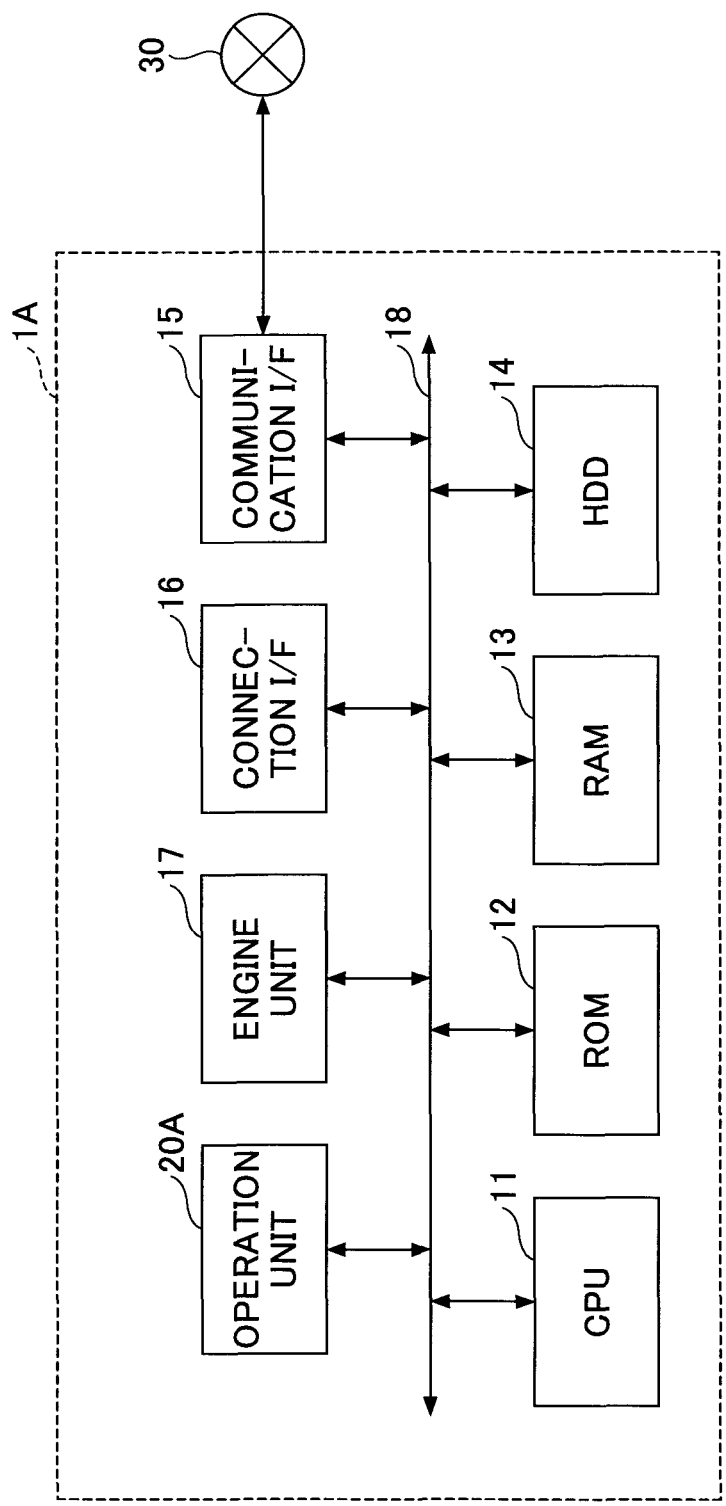

[Fig. 17]
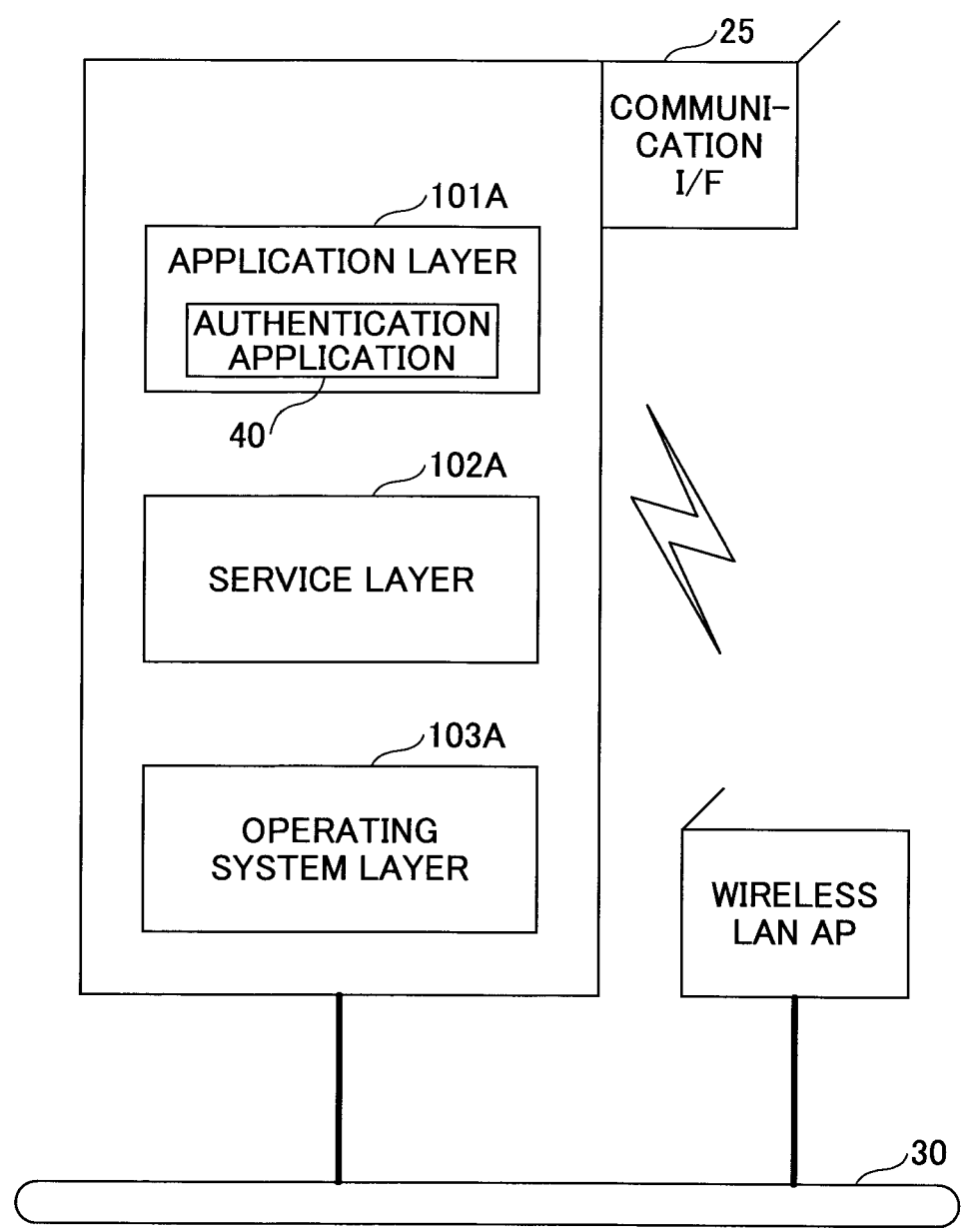

INFORMATION PROCESSING SYSTEM, AUTHENTICATION METHOD, AND NON-TRANSITORY STORAGE MEDIUM STORING AUTHENTICATION PROGRAM FOR INPUTTING AUTHENTICATION PATTERN

TECHNICAL FIELD

The present invention relates to an image processing device, an authentication method, and a non-transitory storage medium that stores an authentication program, which are for executing authentication using an authentication pattern.

BACKGROUND ART

Recently, devices having touch panels are widely used. As an authentication method using such a device, the authentication method has been known such that a user draws a pattern (an authentication pattern) that is desired by the user on a touch panel, and a comparison is made as to whether the pattern matches a pattern that is pre-registered.

In the authentication method, an input operation during an authentication process is simplified compared with known authentication methods in which a character string, such as a password, is input.

SUMMARY OF INVENTION

Technical Problem

The above-described authentication method may be mainly used, for example, with a personal mobile terminal. It may not be expected that the above-described authentication method is applied for a device, such as a multifunction peripheral, in which an operations panel with superior visibility is to be shared by more than one user.

For this reason, if the above-described authentication method is used for a multi-function peripheral, for example, the authentication pattern may be observed and stolen by a third party. Thus, security may become compromised.

There is a need for a technique such that an operation for authentication is simple, and security can be maintained.

Solution to Problem

According to an aspect of the present invention, there is provided an image processing device including an input receiver configured to receive an input of an authentication pattern that is a trajectory of contact coordinates indicating a contact position on an operation unit; and a concatenation image display unit configured to display an image connecting, out of a plurality of predetermined images that are displayed on the operation unit, a part of the predetermined images that includes a first predetermined image and a second predetermined image of the predetermined images that are connected by the trajectory, wherein, prior to a display area of the first predetermined image overlapping the contact coordinates, a display area of the second predetermined image overlaps the contact coordinates.

According to another aspect of the present invention, there is provided an authentication method to be executed by a computer, the method including receiving, by the computer, an input of an authentication pattern being a trajectory of contact coordinates indicating a contact position on an operation unit; and displaying, by the computer, an image connecting, out of a plurality of predetermined images that are displayed on the operation unit, a part of the predetermined images that includes a first predetermined image and a second predetermined image of the predetermined images that are connected by the trajectory, wherein, prior to a display area of the first predetermined image overlapping the contact coordinates, a display area of the second predetermined image overlaps the contact coordinates.

According to another aspect of the present invention, there is provided a non-transitory storage medium storing an authentication program that is executed by a computer, wherein, when the program is executed by the computer, the program causes the computer to execute a process of receiving an input of an authentication pattern that is a trajectory of contact coordinates indicating a contact position on an operation unit; and a process of displaying an image connecting, out of a plurality of predetermined images that are displayed on the operation unit, a part of the predetermined images that includes a first predetermined image and a second predetermined image of the predetermined images that are connected by the trajectory, wherein, prior to a display area of the first predetermined image overlapping the contact coordinates, a display area of the second predetermined image overlaps the contact coordinates.

Advantageous Effects of Invention

Security can be maintained by a simple operation.

BRIEF DESCRIPTION OF DRAWINGS

FIG. 1 is a diagram showing an example of a configuration of an authentication system;

FIG. 2 is a diagram showing an example of a hardware configuration of an image processing device according to an embodiment;

FIG. 3 is a schematic diagram showing an example of a software configuration of the image processing device according to the embodiment;

FIG. 4 is a diagram illustrating functions of the image processing device;

FIG. 5 is a flowchart illustrating registration of an authentication pattern by a registration processing unit;

FIG. 6A is a diagram illustrating an input operation of inputting an authentication pattern to register user information;

FIG. 6B is a diagram illustrating the input operation of inputting the authentication pattern to register the user information;

FIG. 6C is a diagram illustrating the input operation of inputting the authentication pattern to register the user information;

FIG. 7A is a diagram illustrating screen transition during registration of the user information;

FIG. 7B is a diagram illustrating the screen transition during registration of the user information;

FIG. 7C is a diagram illustrating the screen transition during registration of the user information;

FIG. 7D is a diagram illustrating the screen transition during registration of the user information;

FIG. 8 is a diagram showing an example of the user information;

FIG. 9A is a diagram illustrating a part of process executed by an authentication processing unit according to the embodiment;

FIG. 9B is a diagram illustrating a remaining part of process executed by an authentication processing unit according to the embodiment;

FIG. 10A is a first diagram showing an example of displaying a line image according to the embodiment;

FIG. 10B is a first diagram showing the example of displaying the line image according to the embodiment;

FIG. 10C is a first diagram showing the example of displaying the line image according to the embodiment;

FIG. 11A is a second diagram showing an example of displaying the line image according to the embodiment;

FIG. 11B is a second diagram showing the example of displaying the line image according to the embodiment;

FIG. 11C is a second diagram showing the example of displaying the line image according to the embodiment;

FIG. 12A is a diagram showing a modified example of displaying of the line image according to the embodiment;

FIG. 12B is a diagram showing the modified example of displaying the line image according to the embodiment;

FIG. 12C is a diagram showing the modified example of displaying the line image according to the embodiment;

FIG. 13A is a first diagram showing an example of displaying a line image according to another embodiment;

FIG. 13B is a first diagram showing the example of displaying the line image according to the other embodiment;

FIG. 13C is a first diagram showing the example of displaying the line image according to the other embodiment;

FIG. 14 is a flowchart illustrating a process executed by a display controller according to the other embodiment;

FIG. 15A is a second diagram showing an example of displaying the line image according to the other embodiment;

FIG. 15B is a second diagram showing the example of displaying the line image according to the other embodiment;

FIG. 15C is a second diagram showing the example of displaying the line image according to the other embodiment;

FIG. 16 is a diagram showing an example of a hardware configuration of an image processing device according to a further embodiment; and FIG. 17 is a schematic diagram showing an example of a software configuration of the image processing device according to the further embodiment.

DESCRIPTION OF EMBODIMENTS (Embodiment)

An embodiment is explained below by referring to the drawings. FIG. 1 is a diagram showing an example of a system configuration of an authentication system.

An authentication system 100 according to the embodiment may include an image processing device 1; a mail server 2; and a personal computer (PC) 3. The image processing device 1, the mail server 2, and the PC 3 can be mutually connected via a network 30.

The image processing device 1 according to the embodiment includes a main body 10; and an operation unit 20. The main body 10 of the image processing device 1 may include various functions, such as a copy function, a scanner function, a facsimile function, and a printer function. The operation unit 20 of the image processing device 1 may be a liquid crystal display device in which a touch panel function is installed, for example. A touch panel function for receiving a touch input may also be installed in the operation unit 20.

In the operation unit 20 according to the embodiment, an authentication application, which is described below, is installed.

The mail server 2 can store a mail that is transmitted from the image processing device 1 through an authentication application. The mail may be checked, for example, at the PC 3, by the user associated with the mail address.

In FIG. 1, the image processing device 1, the mail server 2, and the PC 3 are connected on the same network 30. However, the image processing device 1 and the PC 3 may also be connected to different networks, respectively.

The image processing device 1 according to the embodiment may be configured such that, in response to determining that a user uses the image processing device 1, the image processing device 1 requests user authentication from the user. The user authentication according to the embodiment can be a scheme for identifying (logging in), among pre-registered users, a user attempting to use a function of the image processing device 1. The image processing device 1 according to the embodiment can prevent information from being leaked and reduce occurrence of erroneous printing by allowing various functions of the image processing device 1 to be used only if a user is identified (a login state).

The user authentication in the image processing device 1 according to the embodiment may be executed by the authentication application.

An example of a hardware configuration of the image processing device 1 according to the embodiment is described below by referring to FIG. 2. FIG. 2 is a diagram showing the example of the hardware configuration of the image processing device 1 according to the embodiment.

The image processing device 1 according to the embodiment may include a main body 10 for implementing various functions, such as a copy function, a scanner function, a facsimile function, and a printer function; and an operation unit 20 for receiving user operations.

Note that receiving the user operations may include receiving information (which may include a signal indicating coordinate values of a screen, for example) that is input in response to the operations by the user. The main body 10 and the operation unit 20 can be mutually connected via a dedicated communication channel 300, so that the main body 10 and the operation unit 20 can communicate each other. As the communication channel 300, a communication channel that conforms to the Universal Serial Bus (USB) standard can be used, for example. However, the communication channel 300 may be a communication channel that conforms to any standard, regardless of whether the standard is a wired communication standard or a wireless communication standard.

The main body 10 according to the embodiment can execute a function that corresponds to an operation that is received by the operation unit 20. Additionally, the main body 10 according to the embodiment can communicate with an external device, such as a personal computer (PC), and the main body 10 can execute a function that corresponds to an instruction received from the external device.

Next, the example of the hardware configuration of the main body 10 is described. The main body 10 may include a Central Processing Unit (CPU) 11; a Read Only Memory (ROM) 12; a Random Access Memory (RAM) 13; a Hard Disk Drive (HDD) 14; a communication interface (I/F) 15; a connection I/F 16; and an engine unit 17, which can be mutually connected via a system bus 18.

The CPU 11 can integrally control functions of the main body 10. The CPU 11 can implement various functions, such as the above-described copy function, scanner function, facsimile function, and printer function, by controlling overall operations of the main body 10 by executing one or more programs that may be stored, for example, in the ROM 12 or the HDD 14, while using the RAM 13 as a work area.

The communication I/F 15 can be an interface for connecting the main body 10 to a network 30. The connection I/F 16 can be an interface for the main body 10 to communicate with the operation unit 20 via the communication channel 300.

The engine unit 17 may be a hardware component for general-purpose information processing; and for executing processes other than a communication process, so as to implement the copy function, the scanner function, the facsimile function, and the printer function. Specifically, the engine unit 17 may include a scanner (an image reading unit) for scanning an image to read a document; a plotter (an image forming unit) for printing an image on a sheet material, such as a paper sheet; and a facsimile device for executing facsimile communication, for example. Furthermore, the engine unit 17 may include a specific optional device, such as a finisher for sorting printed sheet materials, and an automatic document feeder (ADF) for automatically feeding documents.

Next, an example of a hardware configuration of the operation unit 20 is described. The operation unit 20 according to the embodiment may include a CPU 21; a ROM 22; a RAM 23; a flash memory 24; a communication I/F 25; a connection I/F 26; an operation panel 27; and an external connection I/F 28, which can be mutually connected via a system bus 29.

The CPU 21 can integrally control functions of the operation unit 20. The CPU 21 can implement various functions, which are described below, such as a function for displaying information (an image) corresponding to an input that is received from a user, by controlling overall operations of the operation unit 20 by executing one or more programs that may be stored, for example, in the ROM 22 or the flash memory 24, while using the RAM 23 as a work area.

The communication I/F 25 can be an interface for connecting to the network 30. The connection I/F 26 can be an interface for communicating with the main body 10 via the communication channel 300.

The operation panel 27 can receive various types of inputs corresponding to operations of a user; and the operation panel 27 can display various types of information (e.g., information corresponding to a received operation, information indicating a operating condition of the image processing device 1, and information indicating a setting state). In the embodiment, the operation panel 27 is formed of a liquid crystal display (LCD) device in which a touch panel function is installed. However, the operation panel 27 is not limited to this. For example, the operation panel 27 may be formed of an organic electro-luminescence (EL) display device in which a touch panel function is installed. Furthermore, in addition to the organic EL display device or alternative to the organic EL display device, the operation panel 27 may include an operation unit, such as hardware keys; and a display unit, such as lamps.

The external connection I/F 28 can be an interface for connecting the operation unit 20 to an external device. The external device that is connected to the operation unit 20 may be, for example, an IC card reader that can be used for executing user authentication of a user.

Next, by referring to FIG. 3, an example of a software configuration of the image processing device 1 according to the embodiment is described. FIG. 3 is a schematic diagram showing the example of the software configuration of the image processing device 1 according to the embodiment.

In the image processing device 1 according to the embodiment, the main body 10 may include an application layer 101; a service layer 102; and an operating system (OS) layer 103. Entities of the application layer 101, the service layer 102, and the OS layer 103 may be various types of software that may be stored in the ROM 12 and/or the HDD 14, for example. Various types of functions can be provided by executing the various types of software by the CPU 11.

The software of the application layer 101 can be application software (which may be simply referred to as an application, in the following description) that provides a predetermined function by operating hardware resources. For example, as applications, there are a copy application for providing a copy function; a scanner application for providing a scanner function; a facsimile application for providing a facsimile function; and a printer application for providing a printer function.

The software of the service layer 102 may intervene between the application layer 101 and the OS layer 103; and the software of the service layer 102 provides, to an application, an interface for utilizing hardware resources included in the main body 10. More specifically, the software of the service layer 102 provides a function for receiving an operation request for the hardware resources, and a function for arbitrating conflicts among operation requests. As examples of the operation requests that can be received by the service layer 102, there are a request for reading by the scanner and a request for printing by the plotter.

Note that the interface function by the service layer 102 may be provided not only to the application layer 101 of the main body 10, but also to the application layer 201 of the operation unit 20. Namely, the application layer 201 (application) of the operation unit 20 may also implement functions that utilize the hardware resources (e.g., the engine unit 17) of the main body 10 through the interface function of the service layer 102.

The software of the OS layer 103 can be system software (an operating system) for providing a basic function to control hardware components included in the main body 10. The software of the service layer 102 can convert requests, from various types of applications, for using hardware resources into commands that can be parsed by the OS layer 103, and the software of the service layer 102 can transmit the commands to the OS layer 103. Then, by executing the commands by the software of the OS layer 103, the hardware resources can execute functions in accordance with a request from the application.

The operation unit 20 according to the embodiment may include an application layer 201; a service layer 202; and an OS layer 203. As for the layered structure, the application layer 201, the service layer 202, and the OS layer 203, which can be included in the operation unit 20, may be the same as the application layer 101, the service layer 102, and the OS layer 103, respectively, at the side of the main body 10.

However, functions that can be provided by applications of the application layer 201 and types of operation requests that can be received by the service layer 202 differ from the functions that can be provided by the applications of the application layer 101 and the types of operation requests that can be received at the side of the main body 10. The applications of the application layer 201 may be software for providing a predetermined function by causing the hardware resources included in the operation unit 20 to operate. However, the application of the application layer 201 is software for mainly providing a user interface (UI) function, which is for executing operations and display of the functions that can be provided by the main body 10 (e.g., the copy function, the scanner function, the facsimile function, and the printer function).

Additionally, the application layer 201 may include an authentication application 40 for providing a user authentication function in the image processing device 1.

Note that, in the embodiment, in order to maintain independence of functions, the software of the OS layer 103 of the main body 10 and the software of the OS layer 203 of the operation unit 20 are set to be different. Namely, the main body 10 and the operation unit 20 are individually operated by different operating systems. For example, it is possible to use Linux (registered trademark) as the software of the OS layer 103 of the main body 10, while using Android (registered trademark) as the software of the OS layer 203 of the operation unit 20.

As described above, in the image processing device 1 according to the embodiment of the present invention, the main body 10 and the operation unit 20 are operated by different operating systems, respectively. Thus, communication between the main body 10 and the operation unit 20 can be executed as the communication between different devices, as opposed to the communication between processes within the same device.

The communication between the different devices may include an operation to transmit information received by the operation unit 20 (a content of an instruction by a user) to the main body 10 (command communication), and an operation to communicate an event from the main body 10 to the operation unit 20. Here, a function of the main body 10 can be used by having the operation unit 20 execute command communication with the main body 10. As examples of the event that can be communicated from the main body 10 to the operation unit 20, there are an execution status of operation in the main body 10, and a content that is set in the main body 10, for example.

Additionally, in the embodiment, power can be supplied from the main body 10 to the operation unit 20 via the communication channel 300. Thus, power control of the operation unit 20 may be executed separately (independently) from the power control of the main body 10.

Next, functions of the image processing device 1 of the embodiment are described by referring to FIG. 4. FIG. 4 is a diagram illustrating the functions of the image processing device 1.

The image processing device 1 according to the embodiment may include a storage unit 110, and an authentication processing unit 120.

The storage unit 120 may include a screen information storage unit 111; a user information storage unit 112; and a setting information storage unit 113. The screen information storage unit 111 can store information on various types of screens that can be displayed on the operation unit 20. The user information storage unit 112 can store user information that is referred to during execution of user authentication. Details of the user information are described below. The setting information storage unit 113 can store setting information with respect to various types of settings in the image processing device 1.

The storage unit 110 according to the embodiment may be installed inside the HDD 14 that is included in the main body 10 of the image processing device 1. Additionally, only the user information storage unit 112 of the storage unit 110 according to the embodiment may be installed inside the HDD 14 that is included in the main body 10.

The authentication processing unit 120 according to the embodiment can be implemented by the authentication application 40. The authentication processing unit 120 according to the embodiment may include an input receiver 121; a display controller 122; a registration processing unit 123; a trajectory monitoring unit 124; a concatenation image display unit 125; an authentication unit 126; and a communication controller 127.

The input receiver 121 according to the embodiment can receive inputs that correspond to various types of operations from the operation unit 20. Specifically, the input receiver 121 can receive, from a registration screen, which is described below, an input of information that may be required for registration of a user. Additionally, during a log-in process of a user, the input receiver 121 can receive selection of a user on a user selection screen, which is described below, and an input of an authentication pattern.

Further, in a setting screen for executing various types of setting of the authentication application 40, the input receiver 121 can receive an input for changing user setting. Furthermore, during a process of user registration, a process of log-in, and/or a process of lockout release, the input receiver 121 can receive pressing of a button, such as a button of "add user," and a button of "go to authentication pattern input," and the input receiver 121 can instruct the display controller 122 to display the next screen.

The display controller 121 can cause the operation unit 20 to display various types of screens, such as a log-in screen, and information. Specifically, in response to detecting that a user uses the authentication application 40, the display controller 121 can cause the operation unit 20 to display the registration screen for executing user registration, the log-in screen for executing a log-in process of a user, and the setting screen for making various types of setting, for example. Note that the log-in screen may be the screen for a user to input an authentication pattern.

The registration processing unit 123 according to the embodiment can store, in the user information storage unit 112 of the storage unit 110, user information and an authentication pattern that can be received by the input receiver 121 during user registration.

The trajectory monitoring unit 124 according to the embodiment can monitor a trajectory of coordinates indicating a position on the operation unit 20 that is contacted by a user, and the trajectory monitoring unit 124 can determine whether the trajectory overlaps a circular image. In the following description, the coordinates indicating the position that is contacted by the user may be referred to as contact coordinates. The trajectory of the contact coordinates can be the trajectory that indicates a motion of a finger of a user on the operation panel 27.

The concatenation image display unit 125 according to the embodiment can cause the operation unit 20 to display, depending on a trajectory of contact coordinates of a user, an image that is obtained by concatenating circular images that are linked by the contact coordinates. Specifically, the concatenation image display unit 125 can cause an image that connects circular images to be displayed, depending on a trajectory of contact coordinates on the operation panel 27. Details of the concatenation image display unit 125 are described below.

The authentication unit 126 can determine whether a combination of a user selected during a log-in process and an input authentication pattern match content that is registered on the user information storage unit 112.

The communication controller 127 can execute control of communication between the image processing device 1 and an external device.

Note that, in FIG. 4, for convenience of the description, functions related to the authentication application 40 are mainly exemplified. However, the functions of the image processing device 1 are not limited to these.

Further, the functions of the above-described units of the image processing device 1 can be implemented by executing, by the CPU 11, one or more programs that are stored in the storage unit (e.g., the ROM 12, the HDD 14, the ROM 22, and the flash memory 24). However, the embodiment is not limited to this. For example, at least one part of the functions of the units of the image processing device 1 may be implemented by a dedicated hardware circuit (e.g., a semiconductor integrated circuit).

The storage unit 110 according to the embodiment may be implemented, for example, by the HDD 14 of the main body 10. Alternatively, the storage unit 110 according to the embodiment may be implemented, for example, by the flash memory 24 of the operation unit 20.

In the embodiment, the main body 10 and the operation unit 20 can be independently operated by the different operating systems. However, the embodiment is not limited to this. For example, the main body 10 and the operation unit 20 may be operated by the same operating systems.

Furthermore, the one or more programs that can be executed by the image processing device 1 according to the embodiment may be provided by storing, as one or more files in installable formats and/or in executable formats, the one or more programs in a computer readable recording medium, such as a CD-ROM, a flexible disk (FD), a CR-R, a Digital Versatile Disk (DVD), and a Universal Serial Bus (USB) storage device. Alternatively or additionally, the one or more programs may be provided or delivered via a network, such as the Internet. Furthermore, the one or more programs may be provided by installing, in advance, in a non-volatile recording medium, such as a ROM.

Next, registration of user information in the image processing device 1 according to the embodiment is described by referring to FIG. 5. FIG. 5 is a flowchart illustrating registration of an authentication pattern by the registration processing unit 123.

In response to receiving, by the input receiver 121, a request to register user information, the display controller 122 of the image processing device 1 according to the embodiment causes the operation unit 20 to display the registration screen for registering the user information (step S501). Subsequently, the input receiver 121 of the image processing device 1 receives input of a part of the user information (step S502). The part of the user information that is input at step S502 can be a user ID, a user name, and a mail address, for example.

Next, the registration processing unit 123 of the image processing device 1 determines whether the input information includes an error (step S503). The error for this case may be such that the user ID overlaps a user ID that has already been registered.

Upon detecting that there exists an error at step S503, the display controller 122 causes the operation unit 20 to display an error message (step S504), and the process returns to step S502. Here, the error message that is to be displayed may be stored in the screen information storage unit 111, for example.

In response to determining that no error exists at step S503, the registration processing unit 123 uses the display controller 122 to cause the operation unit 20 to display an input screen for inputting an authentication pattern (step S505).

Subsequently, the input receiver 121 of the image processing device 1 receives an input of the authentication pattern (step S506). Details of a method of inputting the authentication pattern are described below.

Subsequently, the display controller 122 of the image processing device 1 causes the operation unit 20 to display a confirmation screen for re-inputting the authentication pattern (step S507). Next, the input receiver 121 of the image processing device 1 receives a re-input of the authentication pattern (step S508). Subsequently, the registration processing unit 123 determines whether the authentication pattern input at step S506 matches the authentication pattern input at step S508 (step S509).

In response to detecting that the authentication patterns do not match at step S509, the display controller 122 of the image processing device 1 causes the operation unit 20 to display an error message (step S510), and the process returns to step S507. The error message displayed here may be stored in the screen information storage unit 111, for example.

Upon detecting that the authentication patterns match at step S509, the registration processing unit 123 executes a user addition process (step S511), and the process ends. The user addition process is defined to be a process of storing, as the user information, the information input at step S502 and the authentication pattern in the user information storage unit 112.

Next, an authentication pattern according to the embodiment is described. The authentication pattern according to the embodiment may be associated with a user ID that can be used to uniquely identify a user.

The authentication pattern according to the embodiment can be used as an alternative to a password that is used for authentication in a usual authentication system. The authentication pattern according to the embodiment can be defined as a non-text graphic (a pattern) that is input from a touch panel of the operation unit 20 by a gesture or touch drawing. In other words, the authentication pattern according to the embodiment may be a pattern that is indicated by a trajectory of the contact coordinates that represent a motion of a finger of a user on the operation panel 27.

In the embodiment, the operation panel 20 can be the touch panel. However, the operation unit 20 may be another device, provided that a non-text pattern can be input to the device. The authentication pattern can be input by a click-and-drag operation by using a mouse, for example.

The authentication processing unit 120 according to the embodiment can extract a characteristic of an authentication pattern that is input in accordance with a certain rule, and the authentication processing unit 120 can execute authentication by determining whether the characteristic matches a characteristic of a registered authentication pattern that is associated with a user ID selected in advance.

In the embodiment, a characteristic that can be extracted from an authentication pattern is converted into numbers. In the following description, the numbers are said to be a characteristic value of the authentication pattern. Note that a characteristic that can be extracted from an authentication pattern may be converted into a text string.

An input operation for inputting an authentication pattern according to the embodiment is described below by referring to FIG. 6. FIG. 6 is a diagram illustrating the input operation for inputting the authentication pattern during registration of user information.

In the embodiment, an input operation for inputting the authentication pattern is executed on a screen, which is displayed on the operation panel 27 of the operation unit 20, such that circular images of three rows by three columns, i.e., nine circular images in total are arranged.

As shown in FIG. 6A, numbers from 1 to 9 are sequentially attached to the circular images, from the circular image at the upper left position, as identifiers for identifying the respective circular images. Note that the numbers are not displayed on the screen.

Upon detecting that a user touches the touch panel of the operation unit 20, the authentication processing unit 120 detects occurrence of the touch operation, and the authentication processing unit 120 obtains information on the touched object. In response to detecting that the finger is slid while touching the touch panel, and that the finger touches another object, the authentication processing unit 120 also obtains information on the other touched object. Furthermore, in response to detecting that the finger is separated from the touch panel, the authentication processing unit 120 detects the termination of the touch operation.

In other words, the authentication processing unit 120 can obtain, from the screen information that is stored in the screen information storage unit 111, information on the object that is arranged at the position that overlaps the contact coordinates. Furthermore, in response to detecting a motion of the contact coordinates, the authentication processing unit 120 monitors the trajectory of the contact coordinates; and upon detecting that the contact coordinates enter an area where another object is located, the authentication processing unit 120 obtains information on the other object.

Upon detecting one of the circular images is touched, the authentication processing unit 120 identifies the number that is associated with the touched object, and the authentication processing unit 120 stores the identified number. Then, after the user touches the first one of the circular images, the authentication processing unit 120 sequentially stores the numbers attached to the circular images that are touched by sliding the finger until the finger is removed from the touch panel; and the authentication processing unit 120 stores the number string as a characteristic value of the authentication pattern. Namely, the characteristic value according to the embodiment is a value (an arrangement) that is obtained by arranging the identifiers that are attached to the respective circular images that are linked by the trajectory of the contact coordinates, in the order by which the circular images are linked.

FIG. 6B shows an example of a display for a case where the circular images corresponding to the identifiers of 1, 2, 3, and 6 are touched in this order by a user by sliding a finger. In the embodiment, upon detecting that an authentication pattern is input, a line image connecting one circular image touched by the user and another circular image touched by the user is displayed by changing the color of the circular images touched by the user. In the embodiment, the image that connects the one circular image touched by the user and the other circular image touched by the user is the image of the line (the line image). However, the embodiment is not limited to this. The image that connects the one circular image and the other circular image may be any image that connects the two circular images by a certain method such that it can be recognized that the two circular images are connected.

FIG. 6C shows a case where the circular images corresponding to the identifiers of 1, 2, 3, 6, 5, and 7 are touched in this order by the user by sliding the finger, and the finger is removed from the touch panel. In this case, the characteristic value of the input authentication pattern is "123657."

In FIGS. 6B and 6C, an example is shown such that the line connecting all the circular images touched by the user is displayed. However, in the embodiment, only a part of the line connecting all the circular images touched by the user may be displayed, during the registration of the authentication pattern. More specifically, the display can be the same as the display during authentication by the authentication processing unit 120, which is described below.

Note that, in the embodiment, upon detecting that a user touches the same point more than twice, the touch for the second time and after that may be ignored, or may be regarded as an error.

In response to detecting that the characteristic values that are extracted by the above-described method match for the two authentication patterns, the authentication processing unit 120 according to the embodiment determines that these authentication patterns match.

Thus, according to the embodiment, the trajectory and the velocity of the touch for inputting one of the authentication patterns may not match the trajectory and the velocity of the touch for inputting the other one of the authentication patterns. However, if it is possible to obtain the trajectory and the velocity of the touch for inputting, a condition reflecting the trajectory and the velocity may be considered for extracting the characteristic value.

In the following description, the fact that characteristic values of two authentication patterns match is equivalent to the fact that the two authentication pattern match.

In the embodiment, the number of the circular images that are used for inputting the authentication pattern may be a number other than nine. The shapes of the images that are used for inputting the authentication pattern may be shapes other than the circular shapes. The image that is used for inputting the authentication pattern may be any non-text image that can be input by an input device, and that can be used to extracting the characteristic value.

Further, in the embodiment, the digit of the characteristic value may preferably be four or more. Namely, in the embodiment, the authentication pattern may preferably be obtained by using four or more circular images.

Next, transition of the screen of the operation unit 20 during the registration of the user information is described by referring to FIG. 7. FIG. 7 is a diagram illustrating transition of the screens during the registration of the user information.

FIG. 7A shows an example of the user selection screen. The user selection screen 71 according to the embodiment is displayed, for example, in response to receiving, by the operation unit 20, an authentication request from a user.

In the user selection screen 71, a list of user names of registered users is displayed. Additionally, a user adding button 71a is displayed on the user selection screen 71. Upon detecting that the user adding button 71a is touched, the authentication processing unit 120 determines that a request to register the user information is received, and the authentication processing unit 120 starts the process as depicted in FIG. 5.

Note that, in the embodiment, a setting may be made, so that only a predetermined administrator can perform a registration process. In this case, a unit may preferably be provided that can be used to confirm that a user is the administrator. Specifically, the unit for confirming that a user is the administrator may be a unit for inputting an administrator password, which differs from a user's password, for example.

FIG. 7B shows an example of a registration screen for registering user information. In the registration screen 72 according to the embodiment, an input field 72a for inputting a user ID, an input field 72b for inputting a user name, and an input field 72c for inputting user's mail address are displayed. Additionally, an authentication pattern input button 72d is displayed on the registration screen. Upon detecting that the authentication pattern input button 72c is operated, the authentication processing unit 120 of the embodiment determines that a request to input an authentication pattern is received, and the authentication processing unit causes the screen to transition to the input screen for inputting the authentication pattern.

The mail address to be input can be used for transmitting information, to a user, from the authentication processing unit 120 that can be implemented by the authentication application 40. However, the mail address may also be used for other purposes, such as transmitting data of the document scanned by the image processing device 1.

FIG. 7C is a diagram showing an example of an input screen for inputting an authentication pattern. In the input screen 73 according to the embodiment, nine circular images 73a for inputting an authentication pattern are displayed.

In the input screen 73, if it is determined that an authentication pattern is input, the characteristic value of the authentication pattern is obtained by the above-described method.

In this case, the maximum value and the minimum value of a number of the numbers that can be included in the characteristic value of the authentication pattern may be set in advance. Then, if it is determined that the number of the numbers included in the characteristic value falls outside the range, a determination may be made that an error occurs, and re-input of the authentication pattern may be prompted. The number of the numbers included in the characteristic value of the authentication can be said to be the number of circular images that are connected by the trajectory of the contact co-ordinates.

FIG. 7D is a diagram showing an example of a re-input screen for re-inputting the authentication pattern. In the re-input screen 74 according to the embodiment, similar to the input screen 73, nine circular images 74a for inputting the authentication pattern are displayed.

If it is determined that the characteristic value of the authentication pattern that is input in the re-input screen 74 matches the characteristic value of the authentication pattern that is input in the input screen 73, the authentication processing unit 120 according to the embodiment obtains the user information by associating the information input in the registration screen 72 with the characteristic value of the authentication pattern.

Next, the user information according to the embodiment is described by referring to FIG. 8. FIG. 8 is a diagram showing an example of the user information.

The user information 112A according to the embodiment is stored in the user information storage unit 112 of the storage unit 110. The user information 112A according to the embodiment is created for each user of the image processing device 1.

The user information 112A according to the embodiment includes, as information items, a user ID, a user name, a mail address, an authentication pattern, and a status.

The values of the information items "the user ID," "the user name," and "the mail address" are the information items that are already input to the corresponding input fields of the registration screen 72.

The value of the information item "the authentication pattern" is the characteristic value of the authentication pattern. The value of the information item "the status" is information indicating whether the user can use the image processing device 1. In FIG. 8, the value of the information item "the status" is set to "available," so that it can be seen that the user with the user ID of "001" can use the image processing device 1.

Next, a process that is to be executed by the authentication processing unit 120 according to the embodiment is described. The authentication processing unit 120 according to the embodiment displays, while the authentication pattern is being input by the user, only a line image between two circular images that are attempted to be connected by the user, and the authentication processing unit 120 deletes other line images. Namely, in the embodiment, the line images are not displayed for all the intervals between all pairs of the adjacent circular images of the circular images that are connected by the continuous trajectory of the contact coordinates. Instead, only the line image between the circular images that are connected by a portion of the trajectory of the contact coordinates is to be displayed.

In the embodiment, by displaying only the line image that connects between the adjacent circular images, it is made difficult to follow the trajectory of the contact coordinates that indicates the trajectory of the input operation by the user. In this manner, the authentication image can be prevented from being observed by a malicious third party. Furthermore, in the embodiment, visibility and operability of the user entering the authentication pattern may not be lost because the trajectory between the circular image that is touched by the user and the circular image that was touched immediately before is displayed. Namely, in the embodiment, the security can be maintained by the simple authentication procedure.

FIG. 9 is a diagram illustrating a process by the authentication processing unit 120 according to the embodiment.

The authentication processing unit 120 according to the embodiment uses the input receiver 121 to determine whether a request to start an authentication process is received (step S901). In response to detecting that a request to start an authentication process is not received at step S901, the authentication processing unit 120 waits until a request to start an authentication process is received.

In response to detecting that a request to start an authentication process is received at step S902, the authentication unit 120 causes the display controller 122 to display a user selection screen, and the authentication unit 120 receives a selection by the user (step S902).

Subsequently, the authentication processing unit 120 causes the display controller 122 to display an input screen for inputting an authentication pattern (step S903). As shown in FIG. 6, the input screen for inputting the authentication pattern according to the embodiment is the screen such that circular images of three rows by three columns, i.e., nine circular images in total are arranged.

Subsequently, the authentication processing unit 120 uses the trajectory monitoring unit 124 to set a variable N to 1 (N=1) (step S904). Here, the variable N indicates a number of circular images that are touched by the user.

Subsequently, the authentication processing unit 120 determines, by using the input receiver 121, whether the N-th circular image is touched (step S905). In response to determining that no touch is detected at step S905, the authentication processing unit 120 waits until a touch is detected.

Upon determining that the N-th circular image is touched, the authentication processing unit 120 determines, by using the trajectory monitoring unit 124, whether there exists the (N−1)-th circular image that is touched (step S906). Namely, the trajectory monitoring unit 124 determines whether the touched circular image is on and after the second circular image.

Upon determining that there is no (N−1)-th circular image that is touched, the authentication processing unit 120 proceeds to step S910, which is described below.

For the case where a determination is made at step S906 that there is the (N−1)-th circular image that is touched, the touched image is on and after the second circular image, and the (N−1)-th touched circular image was touched immediately before the N-th circular image is touched. Thus, the authentication processing unit 120 causes the concatenation image display unit 125 to display a line image that connects the (N−1)-th touched circular image and the N-th touched circular image (step S907).

Subsequently, the authentication processing unit 120 determines whether there exists the (N−2)-th circular image that is touched (step S908). Namely, the trajectory monitoring unit 124 determines whether the touched circular image is on and after the third circular image.

Upon determining that there is no (N−2)-th circular image that is touched, the authentication processing unit 120 proceeds to step S910, which is described below.

If a determination is made at step S908 that a (N−2)-th circular image is touched, the touched image is on and after the third circular image. Thus, the authentication processing unit 120 causes the concatenation image display unit 125 to delete the line image that connects the (N−2)-th touched circular image and the (N−1)-th touched circular image (step S909). By this process, only the line image that is displayed at step S907 is displayed on the operation unit 20.

Subsequently, the authentication processing unit 120 determines, by using the input receiver 121, whether termination of the touch is detected (step S910). Upon determining that the termination of the touch is not detected at step S910, the trajectory monitoring unit 124 sets the parameter N to N+1 (step S911), and the process returns to step S905.

Upon determining that the termination of the touch is detected at step S910, the authentication processing unit 120 obtains, by using the authentication unit 126, the characteristic value of the input authentication pattern (step S912). Subsequently, the authentication processing unit 120 uses the authentication unit 126 to refer to the user information storage unit 112, and the authentication processing unit 120 determines whether the characteristic value corresponding to the user ID of the user selected in the user selection screen matches the characteristic value that is obtained at step S912 (step S913).

Upon determining, at step S913, that the characteristic value corresponding to the user ID of the user selected in the user selection screen does not match the characteristic value that is obtained at step S912, the authentication processing unit 120 causes the display controller 122 to display a notification of an authentication error and a message for prompting re-input of the authentication pattern on the operation unit 20 (step S914), and the process returns to the process of step S903.

Upon determining, at step S913, that the characteristic value corresponding to the user ID of the user selected in the user selection screen matches the characteristic value that is obtained at step S912, the authentication processing unit 120 causes the display controller 122 to display a notification of the completion of the authentication process (step S915), and the authentication processing unit 120 terminates the process.

The display of the line image according to the embodiment is specifically described below by referring to FIGS. 10-12.

FIG. 10 is a diagram showing an example of the display of the line image according to the embodiment. FIG. 10A shows circular images to which the numbers from 1 to 9 are sequentially attached, from the upper left. FIGS. 10B and 10C show the display of the line image for the case where the circular images are touched in the order of "1, 2, 3, 6, 5."

In the embodiment, as shown in FIG. 10B, only the line image S1 is displayed that connects the circular image to which the number "3" is attached and the circular image to which the number "6" is attached. Upon detecting that the finger reaches, as shown in FIG. 10C, the circular image to which the number "5" is attached by sliding, by the user, the finger from the state of FIG. 10B, the concatenation image display unit 125 displays the line image S2, and the concatenation image display unit 125 deletes the line image S1.

In other words, upon detecting that the trajectory of the contact coordinates on the operation panel 27 of the operation unit 20 overlaps the display area, on the operation panel 27, of the circular image to which the number "5" is attached (the first predetermined image), the trajectory monitoring unit 124 causes the concatenation image display unit 125 to display the line image S2. Then, the concatenation image display unit 125 deletes the line image S1 that connects the circular image to which the number "6" is attached (the second predetermined image) and the circular image to which the number "5" is attached (the first predetermined image). At this time, the circular image to which the number "6" is attached is the circular image that overlaps the trajectory of the contact coordinates, before the trajectory of the contact coordinates overlaps the circular image to which the number "5" is attached.

Thus, even if a third party find a state of FIG. 10C, the third party may not find how the circular image to which the number "5" is attached is reached by tracing, in which order, the circular images to which the numbers "1" to "3" are attached.

Thus, in the embodiment, it is possible to ensure security against leakage of the authentication pattern through observation by a malicious third party, without loosing visibility and operability of the user who enters the authentication pattern.

FIG. 11 is another diagram showing an example of the display of the line image according to the first embodiment. In the example of FIG. 11, by adding a certain relationship between a background color of the input screen, which is displayed on the operation panel 27, for inputting the authentication pattern and a color of the line image, peeking or the like by a third party is further suppressed.

In the embodiment, the background color of the input screen 73 for inputting the authentication pattern and the color of the line image are set to an achromatic color, and the brightness of the background color of the input screen 73 is different from the brightness of the color of the line image. Specifically, the input screen 73 and the line image are displayed in such a manner that the brightness level of the color of the line image is lower than the brightness level of the background color of the input screen 73 for inputting the authentication pattern. Note that, in the example of FIG. 11, an area of the input screen 73 is shown where the circular image are to be displayed. The background color of the input screen 73 according to the embodiment may be the background color of the entire input screen 73 that is shown in FIGS. 7C and 7D.

In the example of the input screen 73 that is shown in FIGS. 11A through 11C, the background color is set to the color that is specified by an RGB value of (136, 136, 136), and the color of the line image S1', which is shown in FIGS. 11B and 11C, and the color of the line image S2', which is shown in FIG. 11C, are set to the color that is specified by an RGB value of (128, 128, 128).

In the input screen 73 according to the embodiment, the color of the circular image prior to being touched may be set to white color, and the color of the circular image after being touched may be set to the color that is specified by an RGB value of (0, 128, 0).

In the embodiment, by setting, the background color of the input screen 73 and the color of the line image in this manner, it can be made difficult to view the display of the line image when the operation panel 27 is obliquely viewed.

Thus, in the embodiment, the confidentiality of the authentication pattern can be maintained by making it difficult for a third party to follow the trajectory of the contact coordinates, without reducing visibility to the user entering the authentication pattern while viewing the input screen 73 from the front of the operation panel 27.

Here, the RGB values of the background color of the input screen 73 and the color of the line image in FIG. 11 are for exemplifying purpose only, and the embodiment is not limited to these values. Further, in the example of FIG. 11, the background color of the input screen 73 and the color of the line image are set to the achromatic color, and the brightness of the background color of the input screen 73 is made different from the brightness of the color of the line image. However, the embodiment is not limited to this. For example, the density of the background color of the input screen 73 may be made different from the density of the color of the line image. The gradation values of the background color of the input screen 73 and the color of the line image may be set so that the density level of the color of the line image is greater than the density level of the background color.

FIG. 12 is a diagram showing a modified example of the display of the line image according to the embodiment. In the example of FIG. 12, the relationship between the background color of the input screen 73 for inputting the authentication pattern and the color of the line image is the same as the relationship in the example of FIG. 11.

Further, in the example of FIG. 12, as shown in FIGS. 12B and 12C, the line image S' is displayed that connects all the circular images that are touched by a user.

In FIG. 12, the line image S' is displayed that shows the authentication pattern. However, by setting the background color of the input screen 73 and the color of the line image to be the same as the example of FIG. 11, it can be made difficult to see the display of the line image S' when the operation panel 27 is viewed obliquely. Thus, in the example of FIG. 12, the confidentiality of the authentication pattern can be maintained by making it difficult for a third party to follow the trajectory of the contact coordinates, without reducing visibility to the user entering the authentication pattern while viewing the input screen 73 from the front of the operation panel 27.

In the embodiment, the circular images that are connected by the concatenation image display unit 125 are set to the two circular images, which are the circular image that is currently touched by the user and the circular image that is touched immediately before. However, the embodiment is not limited to this. The circular images to be connected may be, for example, three circular images, which are a first circular image that is currently touched by the user, a second circular image that is touched immediately before, and a third circular image that is touched before the second circular image is touched. The number of the circular images that are to be displayed by the concatenation image display unit 125 may be increased if the digit of the characteristic value of the authentication pattern is large, and the number of the circular images that are to be displayed by the concatenation image display unit 125 may be reduced if the digit of the characteristic value of the authentication pattern is small.

In this embodiment, it suffices if, among all the circular images that are touched by the user, a part of the circular images that includes the circular image currently touched by the user and the circular image that is touched immediately before is connected.

(Another Embodiment)

Another embodiment is described below by referring to FIGS. 13-15. This embodiment differs from the above-described embodiment in that, in the input screen 73 for inputting the authentication pattern, the arrangement of the circular images is to be changed. In the following description of this embodiment, only the differences from the above-described embodiment are described. The same reference numerals that are used for the description of the above-described embodiment are attached to the components that are configured to be the same as the corresponding components of the above-described embodiment, and thereby the descriptions of such components are omitted.

FIG. 13 is a diagram showing an example of the display of the line image according to this embodiment. The arrangement of the circular images that is shown in FIG. 13A is obtained by inverting the arrangement of the circular images in the above-described embodiment (cf. FIG. 6) in the horizontal direction (the left-and-right direction). The circular images to which the numbers from 1 to 9 are attached are sequentially displayed, from the upper right.

In the image processing device 1 according to this embodiment, setting information that indicates, while using, for example, the arrangement of the circular images that is shown in the above-described embodiment as a reference arrangement, whether the reference arrangement is to be inverted in the horizontal direction may be stored in the setting information storage unit 113. In this case, upon detecting that the input screen for inputting the authentication pattern is to be displayed, the display controller 122 according to this embodiment refers to the setting information storage unit 113, and the display controller 122 may display the circular images in accordance with the arrangement that is shown in FIG. 13A, in response to the setting information on the arrangement of the circular images.

In FIG. 13, the example is shown where the arrangement of the circular images is inverted in the horizontal direction. However, the arrangement of the circular images may be inverted in the vertical direction. Note that the manner of displaying the line image S11 and the line image S12, which are shown in FIG. 13, is the same as the manner that is described in the above-described embodiment.

Further, in this embodiment, the arrangement of the circular images may be randomly changed, depending on the characteristic value of the authentication pattern that is included in the user information. The arrangement of the circular images based on the characteristic value of the authentication pattern according to the embodiment is described below.

FIG. 14 is a flowchart illustrating the process executed by the display controller 122 according to the embodiment. The process shown in FIG. 14 corresponds to the process by the display controller 122 at step S903 of FIG. 9.

The authentication processing unit 120 according to the embodiment obtains, by using the display controller 122, the characteristic value corresponding to the user ID of the user selected in the user selection screen (step S141). Subsequently, the authentication processing unit 120 determines, by using the display controller 122, the arrangement of the circular images based on the characteristic value, so that the trajectory of the contact coordinates is a continuous trajectory (step S142).

Subsequently, the authentication processing unit 120 determines, by using the display controller 122, whether the arrangement that is obtained at step S142 is the same as the arrangement of the circular images that is displayed on the input screen 73 for the last time (step S143). Note that, in the embodiment, for each user ID, the arrangement of the circular images is saved, which arrangement is displayed on the input screen 73 for inputting the authentication pattern during the authentication process for the last time.

If it is determined, at step S143, that the arrangement obtained at step S142 is not the same as the arrangement of the circular images displayed on the input screen 73 previously, the authentication processing unit 120 proceeds to step S145.

Alternatively, if it is determined, at step S143, that the arrangement obtained at step S142 is the same as the arrangement of the circular images displayed on the input screen 73 previously, the display controller 122 determines the arrangement of the circular images so that the trajectory of the contact coordinates becomes continuous (step S144). Subsequently, the display controller 122 displays the input screen 73, in which the circular images are displayed in accordance with the determined arrangement, for inputting the authentication pattern (step S145), and the process ends.

The input screen 73 in which the circular images are randomly arranged is described below by referring to FIG. 15. FIG. 15 is another diagram showing an example of the display of the line image according to the embodiment.

In the example of FIG. 15, the characteristic value that corresponds to the user ID of the selected user is "12365."

In response to detecting that the setting information storage unit 113 stores the setting information that indicates that the arrangement of the circular images is to be randomly determined, the display controller 122 according to the embodiment determines the arrangement of the circular images so that the characteristic value of "12365" can be connected by a continuous trajectory. In the embodiment, if the arrangement of the circular images is determined in this manner, a user can input an authentication pattern without separating the finger from the operation panel 27.

Note that, in the example of FIG. 15, the numbers that are attached to the corresponding circular images may be displayed within the corresponding circular images. By memorizing the characteristic pattern of the user's authentication pattern, the user can input the authentication pattern in the operation panel 27, even if the arrangement of the circular images is changed. The manner of displaying the line images in FIGS. 15B and 15C is the same as the manner that is described in the above-described embodiment.

In this embodiment, each time the user input the authentication pattern, the trajectory of the contact coordinates, which represents the motion of the finger of the user, may differ because the arrangement of the circular images on the input screen 73 is determined based on the characteristic value.

Thus, in the embodiment, the confidentiality of the authentication pattern can be maintained by making it difficult for a third party to follow the trajectory of the user's finger, without reducing visibility to the user.

Note that, in the embodiment, for example, upon detecting that the user fails to enter the authentication pattern a predetermined number of times, a button for selecting the reference arrangement as the arrangement of the circular images may be displayed on the operation panel 27

(Further Embodiment)

Further embodiment is described below by referring to FIGS. 16 and 17. This embodiment differs from the above-described embodiment in a point that the main body 10 and the operation unit 20 are integrated. In the following description of this embodiment, only the differences from the above-described embodiment is described. The same reference numerals that are used for the description of the above-described embodiment are attached to the components that are configured to be the same as the corresponding components of the above-described embodiment, and thereby the descriptions of the components are omitted.

FIG. 16 is a diagram showing an example of a hardware configuration of the image processing device 1A according to this embodiment. The image processing device 1A according to this embodiment may include the Central Processing Unit (CPU) 11; the Read Only Memory (ROM) 12; the Random Access Memory (RAM) 13; the Hard Disk Drive (HDD) 14; the communication interface (I/F) 15; the connection I/F 16; the engine unit 17; and an operation unit 20A, which can be mutually connected via a system bus 18.

The operation unit 20A can be, for example, a liquid crystal display device in which a touch panel function is installed, and the operation unit 20A receives a touch input by the touch panel function.

In the image processing device 1A according to this embodiment, the HDD 14 may include the storage unit 110. Further, the image processing device 1A can implement the function of the authentication processing unit 120 by executing various programs stored in a non-volatile recording medium, such as the ROM.

FIG. 17 is a schematic diagram showing an example of a software configuration of the image processing device 1A according to the embodiment.

The image processing device 1A according to the embodiment may include an application layer 101A; the service layer 102; and the OS layer 103. The entities of the application layer 101A, the service layer 102, and the OS layer 103 can be various types of software that can be stored in the ROM 12, the HDD 14, and so forth. By executing the various types of software by the CPU 11, the various types of functions can be provided.

The application layer 101A according to the embodiment may include software for operating the operation unit 20A to provide a predetermined function. Specifically, the application layer 101A may include software for providing a user interface (UI) function for executing operation and display the various functions (the copy function, the scanner function, the facsimile function, and the printer function). Namely, the application layer 101A according to the embodiment may include the authentication application 40 for providing the user authentication function in the image processing device 1A.

With the above-described configuration, even if the main body 10 and the operation unit 20 are not provided as separate devices, the image processing device 1A can implement functions that are the same as the functions of the above-described embodiments.

Namely, according to the embodiment, the confidentiality of the authentication pattern can be maintained by the simple authentication procedure.

In the above-described embodiments, the authentication process is executed only by using the user ID and the authentication pattern. However, the embodiments are not limited to this. The authentication process in the above-described embodiments may be executed in such a manner that, by separately setting a password that corresponds to the user ID, and the authentication process is executed for the user ID by using both the password and the authentication pattern. Additionally, in the above-described embodiments, a setting may be made so that it is possible to select the authentication process by inputting the password or the authentication process by inputting the authentication pattern. Alternatively, a setting may be made so that, only if the authentication patterns match, a correct password that is saved in advance is obtained from a memory, and the authentication process by using the user ID and the password is executed. In short, it suffices if the authentication pattern is used in the authentication process.

The image processing device, the authentication method, and the non-transitory storage medium storing the authentication program, which are for executing authentication using the authentication pattern, are described above by the embodiments. However, the present invention is not limited to the embodiments, and various modifications and improvements may be made within the scope of the present invention. Specific examples of numerical values are used in order to facilitate understanding of the invention. However, these numerical values are simply illustrative, and any other appropriate values may be used, except as indicated otherwise. The separations of the items in the above-described explanation are not essential to the present invention. Depending on necessity, subject matter described in two or more items may be combined and used, and subject matter described in an item may be applied to subject matter described in another item (provided that they do not contradict). A boundary of a functional unit or a processing unit in a functional block does not necessarily correspond to a boundary of a physical component. An operation by a plurality of functional units may be physically executed by a single component. Alternatively, an operation by a single functional unit may be physically executed by a plurality of components. For the convenience of explanation, the devices according to the embodiment of the present invention are explained by using the functional block diagrams. However, these devices may be implemented in hardware, software, or combinations thereof. The software that operates in accordance with the present invention may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and the like.

The present invention can be implemented in any convenient form, for example using dedicated hardware, or a mixture of dedicated hardware and software. The present invention may be implemented as computer software implemented by one or more network processing apparatuses. The network can comprise any conventional terrestrial or wireless communications network, such as the Internet. The processing apparatuses can compromise any suitable programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device. The hardware platform includes any desired hardware resources including, for example, a central processing unit (CPU), a random access memory (RAM), and a hard disk drive (HDD). The CPU may include processors of any desired kinds and numbers. The RAM may include any desired volatile or non-volatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2015-051235 filed on Mar. 13, 2015, the entire contents of which are hereby incorporated by reference.

REFERENCE SIGNS LIST 1, 1A: Image processing device
10: Main body
20: Operation unit
40: Authentication application
110: Storage unit
111: Screen information storage unit
112: User information storage unit
113: Setting information storage unit
120: Authentication processing unit
121: Input receiver
122: Display controller
123: Registration processing unit
124: Trajectory monitoring unit
125: Concatenation image display unit
126: Authentication unit
127: Communication controller

CITATION LIST

Patent Literature

[PTL 1] Patent Document 1: Japanese Unexamined Patent Publication No. 2014-075011

The invention claimed is:
1. An information processing system comprising:
an operation unit;
an input receiver configured to receive an input of an authentication pattern that is a trajectory of contact coordinates indicating a contact position on the operation unit;
a processor; and
a memory that includes instructions, which when executed, cause the processor to execute an authentication application that is installed in the operation unit;

wherein steps executed by the processor include:
displaying an image connecting, out of a plurality of predetermined images that are displayed on the operation unit, a part of the plurality of predetermined images that includes a fist predetermined image and a second predetermined image of the plurality of predetermined images that are connected by the trajectory, wherein, prior to a display area of the first predetermined image overlapping the contact coordinates, a display area of the second predetermined image overlaps the contact coordinates,
among a plurality of predetermined images with respective display areas that overlap the contact coordinates, causing only a line image between two predetermined images to be displayed; and, in response to displaying the line image, causing other line images that have been displayed to be deleted, and
upon detecting that the authentication pattern input through the operation unit matches a registered authentication pattern, allowing a function of the information processing system to be used.

2. The information processing system according to claim 1,
wherein a gradation value of a color of the image connecting the part of the predetermined images is set, so that a density level of the color of the image is greater than a density level of a background color of the plurality of predetermined images.

3. The information processing system according to claim 1, wherein the steps executed by the processor further include:
determining whether a display area of any one of the plurality of predetermined images in the operation unit overlaps the trajectory.

4. The information processing system according to claim 1, further comprising:
a display controller configured to display the plurality of predetermined images in accordance with an arrangement that is obtained by inverting a predetermined arrangement in a vertical direction.

5. The information processing system according to claim 1, further comprising:
a display controller configured to display the plurality of predetermined images in accordance with an arrangement that is obtained by inverting a predetermined arrangement in a horizontal direction.

6. The information processing system according to claim 1, further comprising:
a display controller configured to display the plurality of predetermined images, wherein the display controller is configured to refer to the user information corresponding to the input user ID, and the display controller is configured arrange and display the plurality of predetermined images, so that the predetermined images corresponding to the characteristic value are connected by the trajectory, the trajectory being continuous.

7. An authentication method to be executed by a computer by executing an authentication application installed in an operation unit, the method comprising:
receiving, by the computer, an input of an authentication pattern representing a trajectory of contact coordinates that indicate a contact position on the operation unit; and
displaying, by the computer, an image connecting, out of a plurality of predetermined images that are displayed on the operation unit, a part of the plurality of predetermined images that includes a fist predetermined image and a second predetermined image of the plurality of predetermined images that are connected by the trajectory, wherein, prior to a display area of the first predetermined image overlapping the contact coordinates, a display area of the second predetermined image overlaps the contact coordinates,
wherein the authentication application causes, among a plurality of predetermined images with respective display areas that overlap the contact coordinates, only a line image between two predetermined images to be displayed; and, in response to displaying the line image, the authentication application causes other line images that have been displayed to be deleted, and
wherein, upon detecting that the authentication pattern input through the operation unit matches a registered authentication pattern, the authentication application allows a function of an information processing system to be used.

8. A non-transitory storage medium storing an authentication program to be executed by a computer, wherein, when the program is executed by the computer, the program causes the computer to execute:
a process of receiving an input of an authentication pattern that is a trajectory of contact coordinates indicating a contact position on an operation unit; and
a process of displaying an image connecting, out of a plurality of predetermined images that are displayed on the operation unit, a part of the plurality of predetermined images that includes a fist predetermined image and a second predetermined image of the plurality of predetermined images that are connected by the trajectory, wherein, prior to a display area of the first predetermined image overlapping the contact coordinates, a display area of the second predetermined image overlaps the contact coordinates,
wherein the authentication program is installed in the operation unit,
wherein the authentication program causes, among a plurality of predetermined images with respective display areas that overlap the contact coordinates, only a line image between two predetermined images to be displayed by the computer; and, in response to displaying the line image by the computer, the authentication program causes other line images that have been displayed to be deleted by the computer, and
wherein, upon detecting that the authentication pattern input through the operation unit matches a registered authentication pattern, the authentication application allows a function of an information processing system to be used.

9. The information processing system according to claim 1, wherein the steps executed by the processor further include:
causing the line image to be displayed, so that a brightness level of a color of the line image is lower than a brightness level of a background color.

10. The information processing system according to claim 1, wherein the two predetermined images are attempted to be connected by a user.

11. The information processing system according to claim 1, wherein a part of the two predetermined images is currently touched by a user and the other part of the two predetermined images is touched immediately before the part of the two predetermined images is touched.

12. The information processing system according to claim 1, further comprising:
an engine unit including a plotter.

13. The information processing system according to claim 1, wherein the steps executed by the processor further include:
- causing only a line image between two predetermined images of the plurality of predetermined images to be displayed; and causing other line images to be deleted.

14. The information processing system according to claim 1, wherein the steps executed by the processor further include:
- among the predetermined images, displaying the predetermined images touched by the user in a display state that differs from a display state of the predetermined images not touched by the user; and
- displaying the predetermined images touched by the user in the display state, even if the other line images are deleted.

15. The information processing system according to claim 1, wherein the steps executed by the processor further include:
- displaying a line image connecting, among a plurality of predetermined images, the first predetermined image and the second predetermined image; and
- in response to detecting that the display area of the first predetermined image overlaps the contact coordinate after the display area of the second predetermined image overlaps the contact coordinates, deleting the line image that is displayed between the second predetermined image and a third predetermined image, wherein, prior to a display area of the second predetermined image overlapping the contact coordinates, a display area of the third predetermined image overlaps the contact coordinates.

16. The information processing system according to claim 1, further comprising:
- a display controller configured to display a plurality of predetermined images on the operation unit and configured to associate the plurality of predetermined images with identifiers for respectively identifying the plurality of predetermined images without displaying the identifiers on the operation unit;
- wherein the trajectory of the contact coordinates indicates a non-text pattern on the operation unit,
- wherein steps executed by the processor further include
- obtaining a characteristic value by arranging the identifiers of the respective plurality of predetermined images included in the authentication pattern in order of the predetermined images being traced by the trajectory,
- storing, in the memory, user information obtained by associating a user ID that identifies a user who inputs the authentication pattern with the authentication pattern and the characteristic value, and
- upon detecting that the characteristic value of the authentication pattern input through the operation unit matches a characteristic value of a registered authentication pattern, allowing a function of the information processing system to be used.

\* \* \* \* \*